(12) United States Patent
Rogers

(10) Patent No.: US 9,160,697 B2
(45) Date of Patent: Oct. 13, 2015

(54) DATA DELIVERY OPTIMIZATION

(75) Inventor: Sean S. Rogers, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 787 days.

(21) Appl. No.: 13/342,092

(22) Filed: Jan. 1, 2012

(65) Prior Publication Data
US 2013/0173716 A1 Jul. 4, 2013

(51) Int. Cl.
| | |
|---|---|
| G06F 15/16 | (2006.01) |
| H04L 12/58 | (2006.01) |
| H04L 29/08 | (2006.01) |
| H04L 5/00 | (2006.01) |

(52) U.S. Cl.
CPC .............. *H04L 51/14* (2013.01); *H04L 5/0058* (2013.01); *H04L 5/0069* (2013.01); *H04L 12/58* (2013.01); *H04L 67/104* (2013.01); *H04L 67/108* (2013.01); *H04L 67/1076* (2013.01)

(58) Field of Classification Search
CPC ....... H04L 12/58; H04L 51/14; H04L 5/0058; H04L 5/0069; H04L 67/104; H04L 67/108; H04L 67/1076
USPC .......................................... 709/206, 218, 219
See application file for complete search history.

(56) References Cited

U.S. PATENT DOCUMENTS

| | | | |
|---|---|---|---|
| 6,477,543 B1 | 11/2002 | Huang et al. | |
| 7,000,032 B2 | 2/2006 | Kloba et al. | |
| 7,865,212 B2 | 1/2011 | Tysowski | |
| 7,899,863 B2 | 3/2011 | Caspi et al. | |
| 8,594,558 B2 * | 11/2013 | Childress et al. | 455/3.01 |
| 2002/0163882 A1 * | 11/2002 | Bornstein et al. | 370/227 |
| 2003/0174648 A1 * | 9/2003 | Wang et al. | 370/235 |
| 2003/0204602 A1 * | 10/2003 | Hudson et al. | 709/228 |
| 2004/0073703 A1 * | 4/2004 | Boucher et al. | 709/245 |
| 2004/0172476 A1 * | 9/2004 | Chapweske | 709/231 |
| 2005/0237949 A1 | 10/2005 | Addessi | |
| 2005/0283487 A1 | 12/2005 | Karlsson et al. | |
| 2006/0007947 A1 * | 1/2006 | Li et al. | 370/432 |

(Continued)

FOREIGN PATENT DOCUMENTS

WO WO 2011/075311 A1 * 12/2010 .............. H04L 29/08

OTHER PUBLICATIONS

Jia and Chen, "GMT: A Geometry-based Model on BitTorrent-like Topology", ICSP2006 Proceedings, IEEE (2006).*

(Continued)

*Primary Examiner* — David Lazaro
*Assistant Examiner* — Robert Shaw
(74) *Attorney, Agent, or Firm* — Shirin Tefagh; Joseph Agusta

(57) ABSTRACT

The various embodiments provide systems, devices, and methods which optimize the way in which data is delivered between devices a group of interconnected devices. In one embodiment a data set intended for multiple devices may be segmented and different portions of the data set may be provided to each device. The intended devices may then share their data set portions to recreate the complete data set on each device. In another embodiment, multiple devices each storing a complete data set may need to upload the complete data set to a single device. The multiple devices may assign upload responsibility for segments of the complete data set among each other, and the multiple devices may each upload their assigned segments to the single device. The single device may then combine the segments to recreate the complete data set.

75 Claims, 33 Drawing Sheets

(56) References Cited

U.S. PATENT DOCUMENTS

| | | | |
|---|---|---|---|
| 2006/0053209 A1 | 3/2006 | Li | |
| 2006/0224666 A1* | 10/2006 | Allen | 709/203 |
| 2006/0271530 A1* | 11/2006 | Bauer | 707/5 |
| 2007/0055862 A1* | 3/2007 | Sharma et al. | 713/150 |
| 2007/0130361 A1* | 6/2007 | Li | 709/231 |
| 2007/0136384 A1* | 6/2007 | Hepper et al. | 707/200 |
| 2007/0174471 A1* | 7/2007 | Van Rossum | 709/229 |
| 2007/0192321 A1* | 8/2007 | Farr et al. | 707/9 |
| 2007/0208748 A1 | 9/2007 | Li | |
| 2007/0266169 A1* | 11/2007 | Chen et al. | 709/231 |
| 2007/0288638 A1* | 12/2007 | Vuong et al. | 709/226 |
| 2008/0005113 A1* | 1/2008 | Li | 707/9 |
| 2008/0005336 A1* | 1/2008 | Cohen et al. | 709/227 |
| 2008/0235746 A1* | 9/2008 | Peters et al. | 725/111 |
| 2008/0299988 A1* | 12/2008 | Dawson et al. | 455/456.1 |
| 2008/0301017 A1* | 12/2008 | Dawson et al. | 705/35 |
| 2009/0037529 A1* | 2/2009 | Armon-Kest et al. | 709/204 |
| 2009/0100128 A1* | 4/2009 | Czechowski et al. | 709/203 |
| 2009/0122697 A1* | 5/2009 | Madhyasha et al. | 370/229 |
| 2009/0144412 A1* | 6/2009 | Ferguson et al. | 709/224 |
| 2009/0182815 A1 | 7/2009 | Czechowski, III et al. | |
| 2009/0225657 A1* | 9/2009 | Haggar et al. | 370/235 |
| 2009/0228542 A1 | 9/2009 | Meijer et al. | |
| 2009/0238182 A1* | 9/2009 | Yanagihara | 370/390 |
| 2009/0248886 A1* | 10/2009 | Tan et al. | 709/231 |
| 2009/0319502 A1* | 12/2009 | Chalouhi et al. | 707/4 |
| 2010/0023693 A1* | 1/2010 | Dilley et al. | 711/118 |
| 2010/0057872 A1* | 3/2010 | Koons et al. | 709/206 |
| 2010/0125643 A1* | 5/2010 | Gerber et al. | 709/217 |
| 2010/0293172 A1* | 11/2010 | Straub et al. | 707/755 |
| 2011/0060798 A1* | 3/2011 | Cho et al. | 709/206 |
| 2011/0131278 A1* | 6/2011 | Nieh et al. | 709/204 |
| 2011/0153737 A1* | 6/2011 | Chu et al. | 709/204 |
| 2011/0238756 A1* | 9/2011 | Damola et al. | 709/204 |
| 2011/0307538 A1* | 12/2011 | Rimac et al. | 709/202 |
| 2011/0317580 A1* | 12/2011 | Kozisek et al. | 370/252 |
| 2012/0124173 A1* | 5/2012 | De et al. | 709/219 |
| 2012/0284363 A1* | 11/2012 | Brown | 709/217 |

OTHER PUBLICATIONS

Jin Li, "On peer-to-peer (P2P) content delivery", Peer-to-Peer Netw Appl (2008) pp. 45-63.*

Urvoy-Keller and Michiardi, "Impact of Inner Parameters and Overlay Structure on the Performance of BitTorrent", InfoCom 2006.*

Xiao et al, "Distributed Proximity-Aware Peer Clustering in BitTorrent-Like Peer-to-Peer Networks", IFIP 2006, Springer LNCS 4096, 2006, pp. 375-384.*

Bindal et al, Improving Traffic Locality in BitTorrent via Biased Neighbor Selection, ICDCS'06, IEEE (2006).*

Wu et al—Improving the Download Time of BitTorrent-like Systems, ICC 2007.*

Partial International Search Report and Written Opinion—PCT/US2012/072344—ISA/EPO—Apr. 23, 2013.

Wikipedia: "BitTorrent", Dec. 30, 2011, XP002695081.

Wikipedia: "Torrent file", Dec. 25, 2011, XP002695082.

International Search Report and Written Opinion—PCT/US2012/072344—ISA/EPO—Jul. 5, 2013.

* cited by examiner

DATA DELIVERY OPTIMIZATION

FIELD

The present invention relates generally to data transfer between computer devices and more particularly to methods and systems for optimizing the delivery of data to mobile devices.

BACKGROUND

Today's busy information worker may have multiple mobile devices all capable of working with data. As an example a traveler may have two mobile devices, such as a smart phone and a laptop computer. The smart phone and laptop computer may both be capable of manipulating and presenting the traveler with the same data, such as e-mail. While the smart phone and laptop computer may be capable of performing the same tasks, under various circumstances the user may prefer to work with one device over the other. For example, travelers may find occasionally checking e-mail on a smart phone useful, but may feel more productive doing involved work or reading on a laptop computer due to the laptop computer's generally larger screen and larger keyboard.

A common problem faced by many travelers involves synchronizing multiple mobile device data sets with a central database server when working in locations where all of the traveler's mobile devices may not have connectivity. As an example, a traveler may sync their laptop computer and smart phone with an e-mail exchange server prior to boarding an airplane, such that the laptop computer and smart phone are both up to date with respect to sent and received e-mail. The traveler may work on the airplane writing and answering e-mails on the laptop computer. Should the traveler write several e-mails on their laptop computer, which may be isolated from a network connection while in flight, those drafted e-mails may be held in a queue for transmission to the e-mail exchange server when a network connection becomes available. The traveler's laptop computer and smart phone would then be out of sync in terms of e-mail because the laptop computer would contain drafted e-mails which the smart phone does not. Upon landing, the traveler's smart phone may connect to a cellular data network and download the latest e-mail from the e-mail exchange server. The traveler may use their smart phone to write and answer e-mails in the airport, and the cellular data network connection may enable the smart phone and server to remain updated in terms of e-mail. However, the laptop computer will remain out of sync both in terms of both incoming and the outgoing e-mail until it establishes a network connection. The traveler may now be faced with a data synchronization problem because the laptop computer, smart phone, and e-mail exchange server may all contain different e-mail data sets. This data synchronization problem may cause the traveler frustration and hinder traveler productivity.

SUMMARY

The systems, methods, and devices of the various embodiments optimize the way in which data is delivered between mobile computing devices. The various embodiments leverage the interconnected nature of modern computing devices to optimize the delivery of a data set between a group of interconnected devices. In one embodiment a data set intended for a user having multiple computing devices may be segmented by an e-mail server and different portions of the data set may be transmitted to each of the user's computing devices. The two or more mobile computing devices may then share their data set portions with each other to recreate the complete data set on each computing device. In another embodiment, multiple computing devices each storing a complete data set may upload the complete data set to a single computing device (e.g., an e-mail server) by assigning upload responsibility for different segments of the complete data set to each device. Each of the multiple computing devices may upload their assigned segments to the single computing device. The single computing device may then combine the segments to recreate the complete data set.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
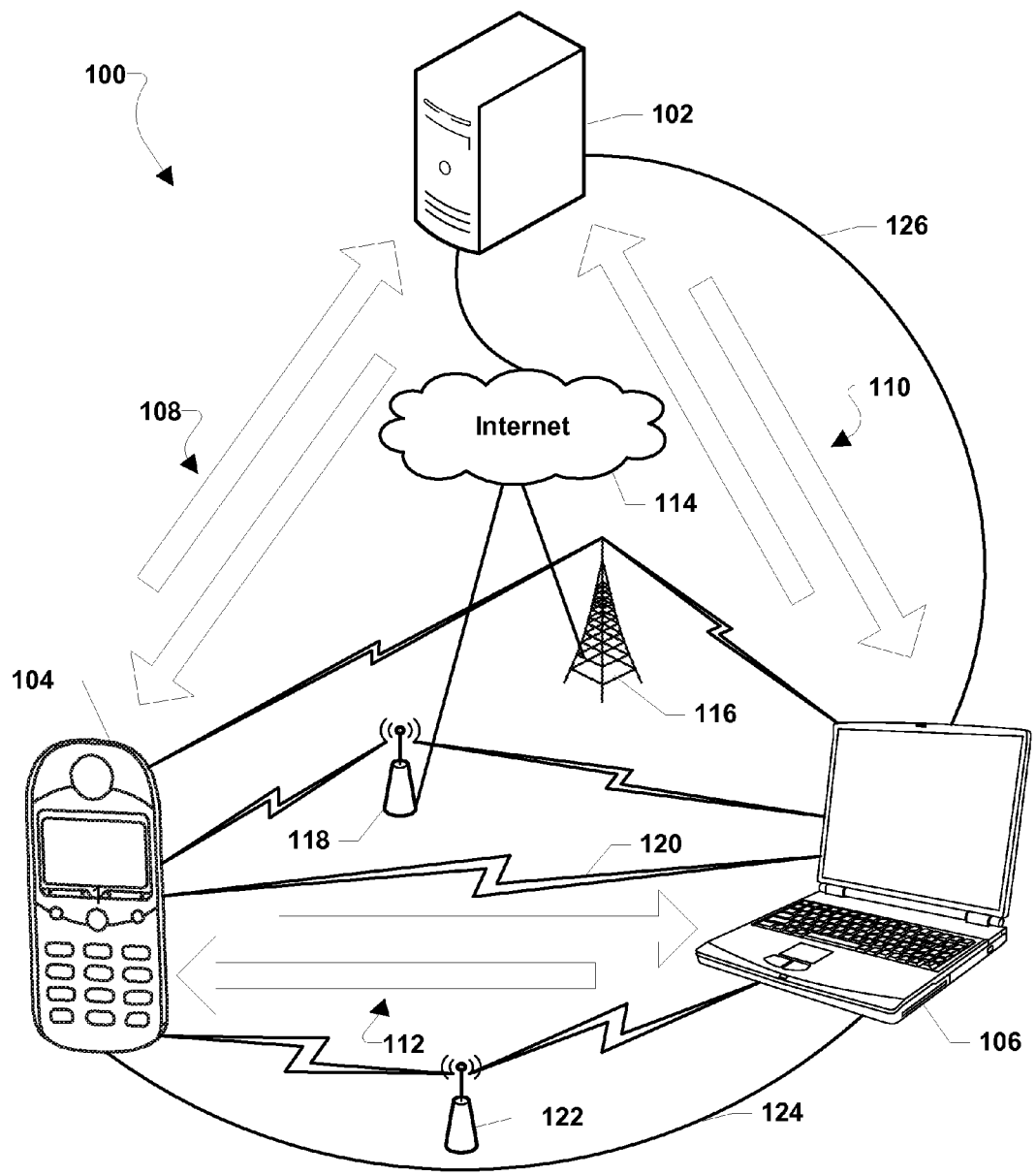
FIG. 1 is a communication system block diagram of a network suitable for use with various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

As used herein, the terms "mobile device" and "mobile computing device" refer to any one or all of cellular telephones, tablet computers, personal data assistants (PDAs), palm-top computers, notebook computers, laptop computers, personal computers, wireless electronic mail receivers and cellular telephone receivers (e.g., the Blackberry® and Treo® devices), multimedia Internet enabled cellular telephones (e.g., Blackberry Storm®), multimedia enabled smart phones (e.g., Android® and Apple iPhone®), and similar electronic devices that include a programmable processor, memory, a communication transceiver, and a display.

The various embodiments are described herein using the example of a traveler working with two mobile computing devices which synchronize data with a central database server (i.e., an e-mail server). This example is useful for describing the various components and functionality of the embodiment computing devices, systems and methods. However, the embodiments and the scope of the claims are not limited to such a configuration and application unless specifically recited. Describing the embodiments in terms of other potential applications would be unnecessary and repetitive. Thus, the term traveler is used herein to refer generally to any computing device user to which the embodiments could be applied, and is not intended to limit the scope of the claims unless specifically recited.

Similarly, the term e-mail is used herein to refer generally to any and all data to which the embodiments could be applied, including a variety of word, spread sheet, and multimedia files, and is not intended to limit the scope of the claims unless specifically recited.

The various embodiments are described herein using the term server. The term server is used to refer to any computing device capable of functioning as a server, such as a master exchange server, mail server, document server, or any other type of server. A server may be a dedicated computing device or a computing device running an application which may cause the computing device to operate as a server. A server application may be a full function server application, or a light or secondary server application that is configured to provide synchronization services among the dynamic databases on mobile computing devices. A light server or secondary server may be a slimmed-down version of server type functionality that can be implemented on a mobile computing device thereby enabling it to function as an Internet server (e.g., an enterprise e-mail server) only to the extent necessary to provide the functionality described herein.

In overview, the methods, systems, and devices of the various embodiments optimize the way in which data is delivered between computing devices. The various embodiments leverage the interconnected nature of modern computing devices to optimize the delivery of a data set between a group of interconnected computing devices. In one embodiment a data set intended for multiple mobile computing devices may be segmented and different portions of the data set may be provided to each mobile computing device. The intended mobile computing devices may then share their data set portions to recreate the complete data set on each mobile computing device. In another embodiment, multiple mobile computing devices each storing a complete data set may need to upload the complete data set to a single computing device. The multiple mobile computing devices may assign upload responsibility for segments of the complete data set among each other, and the multiple mobile computing devices may each upload their assigned segments to the single computing device. The single computing device may then combine the segments to recreate the complete data set.

In another embodiment a user's two or more mobile computing devices may be configured to recognize when one of the mobile computing devices is out of synchronization with the other in terms of a particular data set. If such a situation is detected, the mobile computing devices may accomplish an update or synchronization so that both mobile computing devices reflect a common data set. In another embodiment a mobile computing device may validate itself to other mobile computing devices so that synchronization is only accomplished between two mobile computing devices authorized by the user. In another embodiment, mobile computing devices may be configured to receive temporary data generated in one mobile computing device that is pending synchronization with another computing device, such as a server. In another embodiment, the mobile computing devices may be configured to translate data between applications to match the application format implemented on each mobile computing device. In a further embodiment, alternating or load-balancing of data delivery may be accomplished to optimize the overall speed or cost of data delivery. In a further embodiment conditional data delivery capabilities implemented on one or more of the mobile computing devices may de-conflict data delivery occurring simultaneously from multiple parties or multiple party e-mail threads.

FIG. 1 illustrates a network system 100 suitable for use with the various embodiments. The network system 100 may include three devices, a server 102, and two mobile computing devices, a smart phone 104 and a laptop computer 106. While the various embodiments are particularly useful in relation to a server 102, smart phone 104, and laptop computer 106, the embodiments are not limited to these devices and may be implemented in any device with no changes to the methods. Additionally, while the various embodiments are discussed in relation to interactions between three devices, the embodiments are not limited to three devices, and the methods may be implemented in network systems comprised of an unlimited number of devices.

The server 102 may be a master exchange server, mail server, document server, or any other type of central database server. The server 102 and the smart phone 104 may exchange data with each other via a communication pathway 108. The laptop computer 106 and the server 102 may exchange data with each other via communication pathway 110. The laptop computer 106 and the smart phone 104 may communicate with each other via the communication pathway 112. The communication pathways 108, 110, and 112 may be used to transmit data between the devices. The communication pathways 108, 110, and 112 may be any connection type known in the art.

As an example, the communication pathways 108 and 110 used to connect to the server 102 may be wireless connections, such as a wireless Wi-Fi connection between the smart phone 104 and/or the laptop computer 106 and a Wi-Fi access point 118. The Wi-Fi access point 118 may connect to the Internet 114. The server 102 may be connected to the Internet 114, and in this manner data may be transmitted from/to the smart phone 104 and/or the laptop computer 106 via the Wi-Fi access point 118, and over the Internet 114 to/from the server 102 by methods well known in the art. As additional examples, communication pathways 108 and 110 may be established using a cellular network. The smart phone 104 and/or the laptop computer 106 may transmit data wirelessly to a cellular network cell tower or base station 116 which may connect to the Internet 114. The server 102 may be connected to the Internet 114, and in this manner data may be transmitted from/to the smart phone 104 and/or the laptop computer 106 via the wireless cellular tower or base station 116, and over the Internet 114 to/from the server 102 by methods well known in the art. As a further example, the communication pathway 110 between the laptop computer 106 and the server 102 may be a wired local area network connection, such as an Ethernet connection 126.

As an example, the communication pathway 112 between the smart phone 104 and the laptop 106 may be a wireless data link, such as a BlueTooth connection 120. As an additional example, the communication pathway 112 between the smart phone 104 and the laptop computer 106 may be a wireless Wi-Fi data link via a Wi-Fi access point 122. In this manner data may be transmitted from/to the smart phone 104 and/or the laptop computer 106 via the Wi-Fi access point 122 by methods well known in the art. As an additional example, the communication pathway 112 may also be a wired connection between the laptop computer 106 and smart phone 104, such as a USB cable 124 connected between the devices.

The communication pathways 108, 110, and 112 may be any wired connections, such as a USB connection, a FireWire connection or local area network connection (e.g., Ethernet), as well as any wireless communication links, such as Bluetooth, Wi-Fi, ZigBee, cellular, CDMA, TDMA, GSM, PCS, G-3, G-4, LTE, or any other type wired or wireless connection. While the various aspects are particularly useful with the various embodiments, the communication pathways 108, 110, and 112 are not limited to these communication technologies and communication pathways 108, 110, and 112 may be established using any communication technology known in the art without changing the implementation of the embodiment methods.

Figure 2:
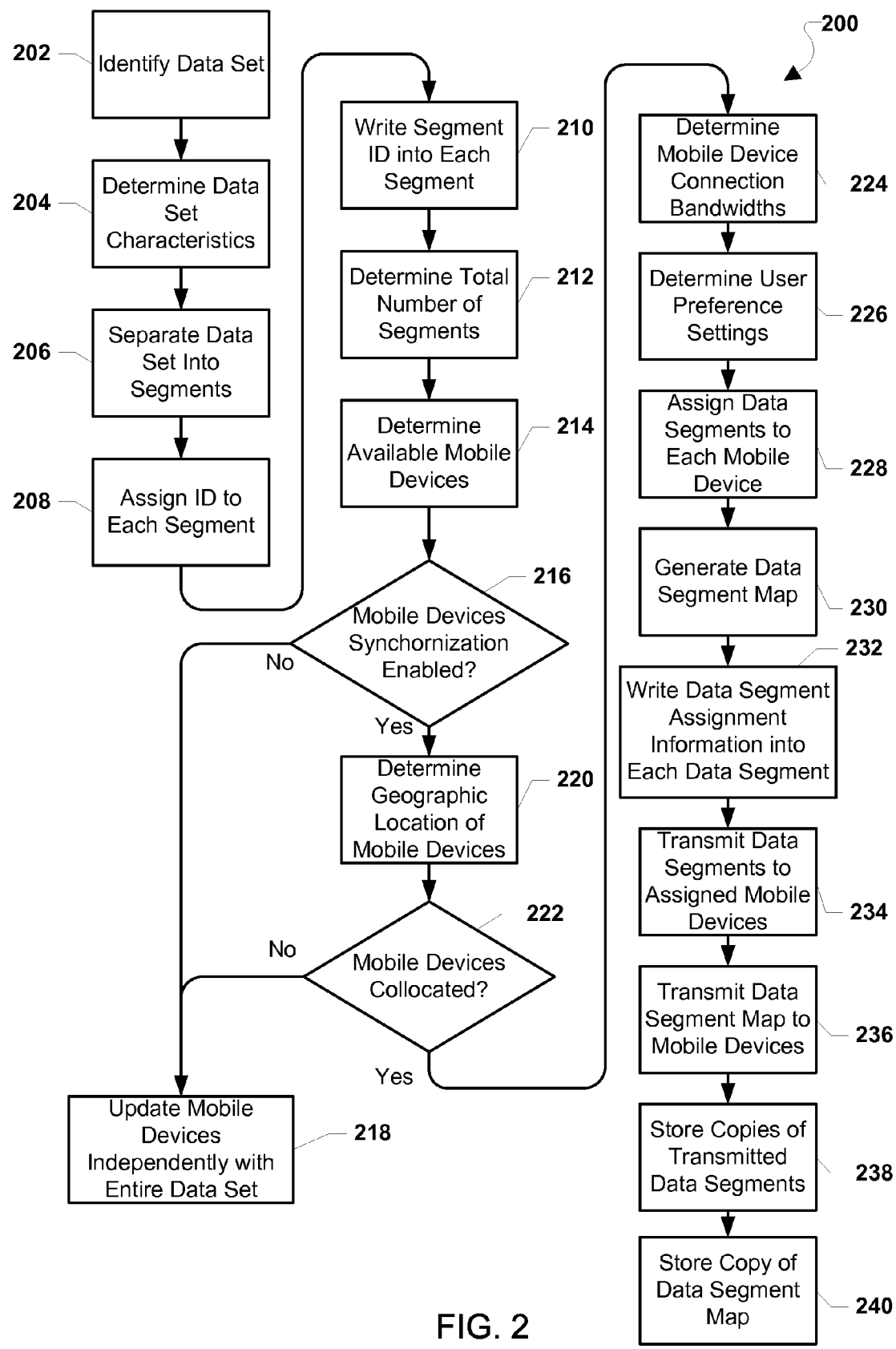
FIG. 2 is a process flow diagram illustrating a first embodiment method for optimizing data delivery.

FIG. 2 illustrates an embodiment method 200 for optimizing data delivery among three or more computing devices. As an example, the method 200 may be implemented between a server 102 and two or more mobile computing devices, such as a smart phone 104 and laptop computer 106. While discussed in relation to a server 102, smart phone 104, and laptop computer 106, the method 200 may be implemented in any device with the ability to act as a data server for other devices. At block 202 the server 102 may identify a data set to be communicated to the mobile computing devices. A data set may include any group of data, such as content objects, e-mails, lines of e-mails, text, blocks of text, web pages, parts of web pages, zip files, spread sheets, documents, portions of documents, files, and/or parts of files. At block 204 the server 102 may determine characteristics of the data set. Data set characteristics may include various characteristics discussed further below. At block 206 the server 102 may separate the data set into segments. A segment may include any grouping of the data within the data set, so the separation of the data set at block 206 may be performed based on the data set characteristics determined in block 204, or the data set may be separated according to pre-determined parameters, such as a set segment size. At block 208 the server 102 may assign an identification ("ID") to each segment. This segment ID may be a unique number, name, or identification element generated by the server 102. Additionally a segment ID may contain or provide information about the segment, such as information regarding the segment contents, the time of creation of the segment, the server 102, or the segment size. At block 210 the server 102 may write the segment ID into each segment. The segment ID may be written into data representing the entire segment, or may be written into each data element comprising the individual segment.

At block 212 the server 102 may determine the total number of segments created from the data set. In block 214 the server 102 may determine the available mobile computing devices. Available mobile computing devices may be a smart phone 104 and a laptop computer 106, for example, which may be connected to the server 102. Alternatively, available mobile computing devices may be mobile computing devices that are registered with the server 102, but that may not currently be connected to the server 102. At determination block 216, the server may determine whether the mobile computing devices are synchronization enabled. A synchronization enabled mobile computing device may be a mobile computing device that is capable of synchronizing/exchanging information with another mobile computing device. For example, a synchronization enabled smart phone 104 may be able to synchronize its data set with a data set of a synchronization enabled laptop computer 106. If the available mobile computing devices are not synchronization enabled (i.e., determination block 216="No"), in block 218 the server 102 may update the mobile computing devices independently with the entire data set.

If the available mobile computing devices are synchronization enabled (i.e., determination block 216="Yes"), at block 220 the server 102 may determine the geographic location of the mobile computing devices. The server 102 may determine the geographic location of the mobile computing devices by global positioning system (GPS) information provided to the server 102 by the mobile computing devices, by reference to information about the connections through which the mobile computing devices may be communicating to the server 102 (i.e., which cell network nodes the mobile computing devices may be using), through a mobile computing device user input identifying the location of each mobile computing device, or other methods. At determination block 222 the server may determine if the mobile computing devices are collocated. As examples, collocation may be determined by comparing mobile computing device GPS information, cellular network information, or user inputs. As an example, the server 102 may determine two mobile computing devices are more than a distance threshold setting apart based on GPS information. The distance threshold setting may be a maximum distance between devices defining collocation. If the mobile computing devices are not collocated (i.e., determination block 222="No"), at block 218 the server 102 may update the mobile computing devices independently with the entire data set.

If the mobile computing devices are collocated (i.e., determination block 222="Yes"), at block 224 the server 102 may determine the mobile computing device connection bandwidths. Alternatively, the server 102 may determine an estimated mobile computing device connection bandwidth for each mobile computing device based on the type of connection the mobile computing device may be using to communicate with the server 102. At block 226 the server 102 may determine user preference settings. User preference settings may be related to connections or devices to use for updates. User preference settings are discussed below.

At block 228 the server 102, may assign data segments to each mobile computing device. The assignments of data segments to each mobile computing device may be made based on various considerations discussed below. At block 230, the server may generate a data segment map identifying each data segment and the mobile computing device to which each segment may be assigned or other elements as discussed below. At block 232 the server 102 may write data segment assignment information into each data segment. The data segment assignment information may be written into data representing the entire segment, or may be written into each data element comprising the individual segment. At block 234 the server 102 may transmit the data segments to their assigned mobile computing devices. In this manner each mobile computing device may receive different data segments. As an example, a laptop computer 106 may receive a first portion of the data segments and a smart phone 104 may receive a second portion of the data segments, such that the combination of the first and second portions will yield the entire data set. At block 236 the server 102 may transmit the data segment map to each mobile computing device. In this manner each mobile computing device may receive a copy of the entire data segment map. The data segment map may allow the individual mobile computing devices to determine the contents or the original data set even though each mobile computing device may not receive all the segments of the original data set from the server.

At block 238 the server 102 may store copies of the transmitted data segments and at block 240 the server 102 may store a copy of the data segment map. In this manner, the server 102 may be able to support future single device sessions, or retransmission of assigned data segments should a device connection fail.

Figure 3:
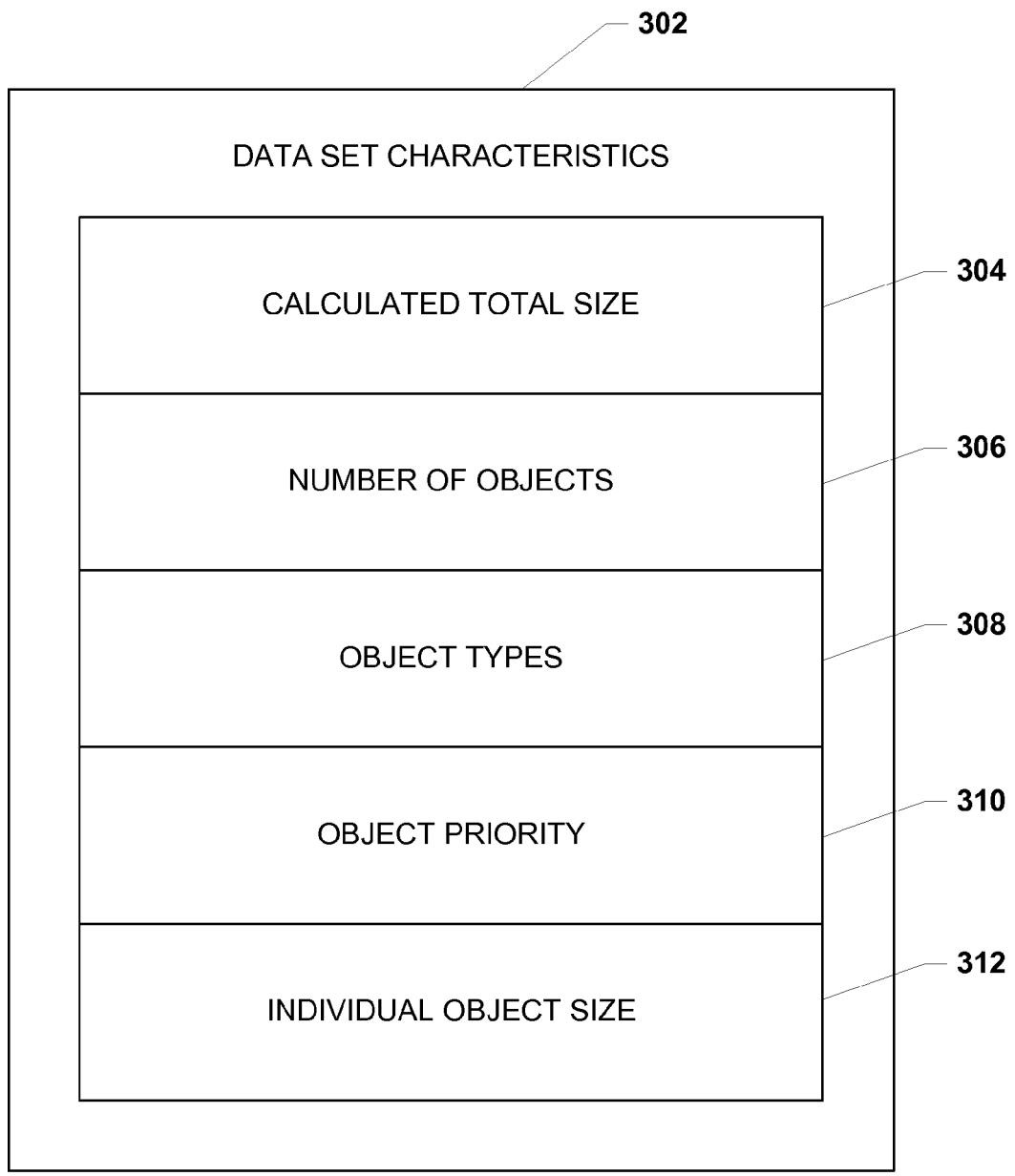
FIG. 3 is a schematic diagram of example data set characteristics.

FIG. 3 is a schematic diagram illustrating potential data set characteristics 302. Data set characteristics 302 may include the calculated total size 304 of the data set. The total size 304 may be calculated in bytes or any other unit representative of the total size 304 of the data set. Data set characteristics 306 may also include the number of objects 206, type of objects 308, object priority 310, and individual object size 312.

Figure 4:
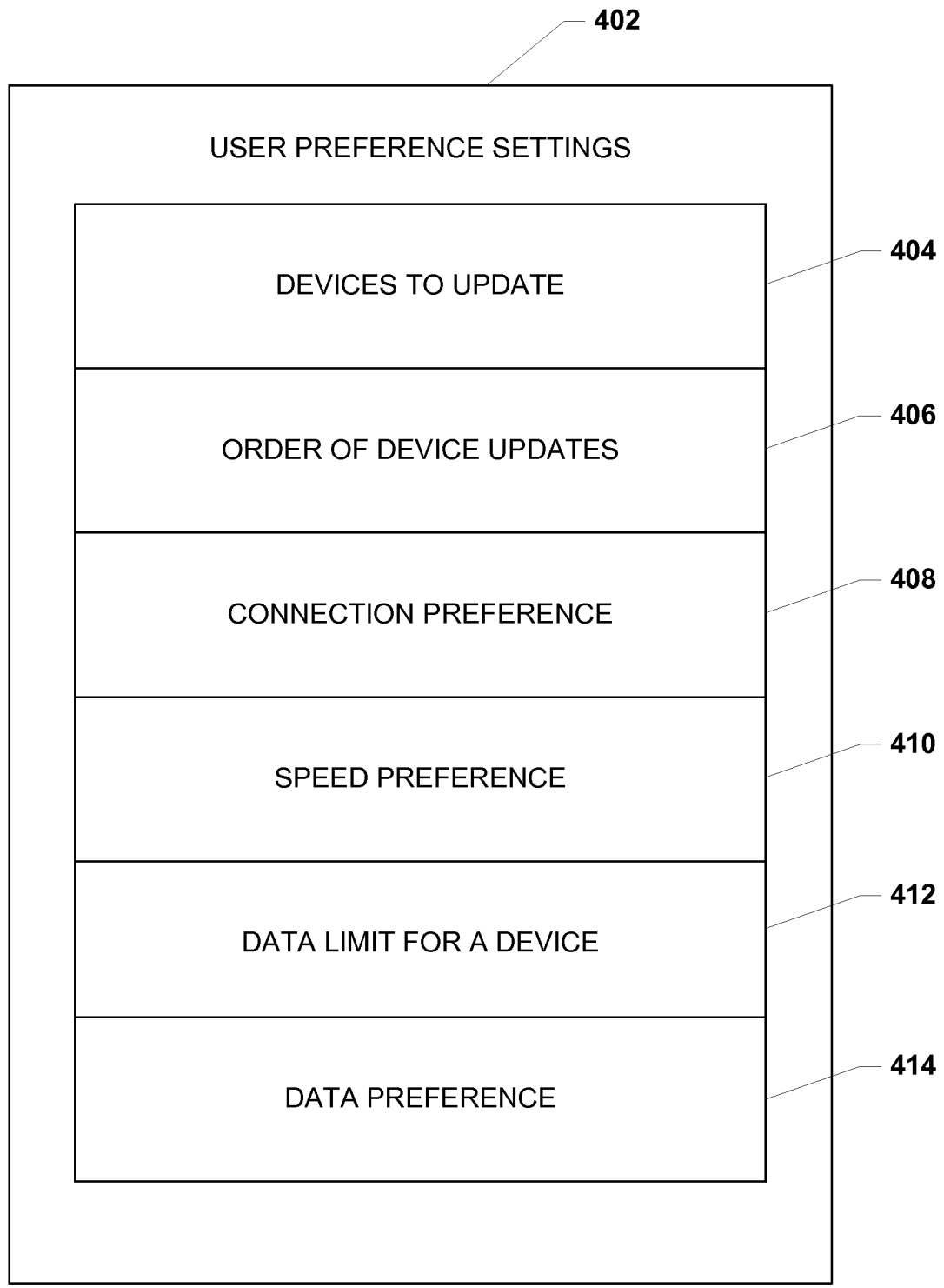
FIG. 4 is a data structure diagram of example user preference settings.

FIG. 4 is a data structure diagram illustrating potential elements of user preference settings 402 which may be stored in a memory of a server 102. User preference settings 402 may include a listing of devices to update 404, an order of device updates 406, a connection preference 408, a speed preference 410, a data limit for a device 412, or a data preference 414. As an example, a listing of devices to update 404 may identify a selected number of a user's mobile computing devices, enabling a user to control which devices are updated. As an example, an order of device updates 406 may direct a server 102 to update the selected devices in a particular order or priority sequence. As an example, a connection preference 408 may direct a server 102 to use a Wi-Fi connection rather than a CDMA connection. Alternatively, a connection preference 408 may direct a server 102 to use the least expensive connection among a group of available connections. As an example, a speed preference 410 may direct a server 102 to use the fastest connections available. As an example, a data limit for a device 412 may set a maximum amount of data to transmit from the server 102 to a device. As an example, a data preference 414 may direct a server 102 to assign a specific data type, such as e-mail, to a specific mobile device, such as a smart phone 104.

Figure 5:
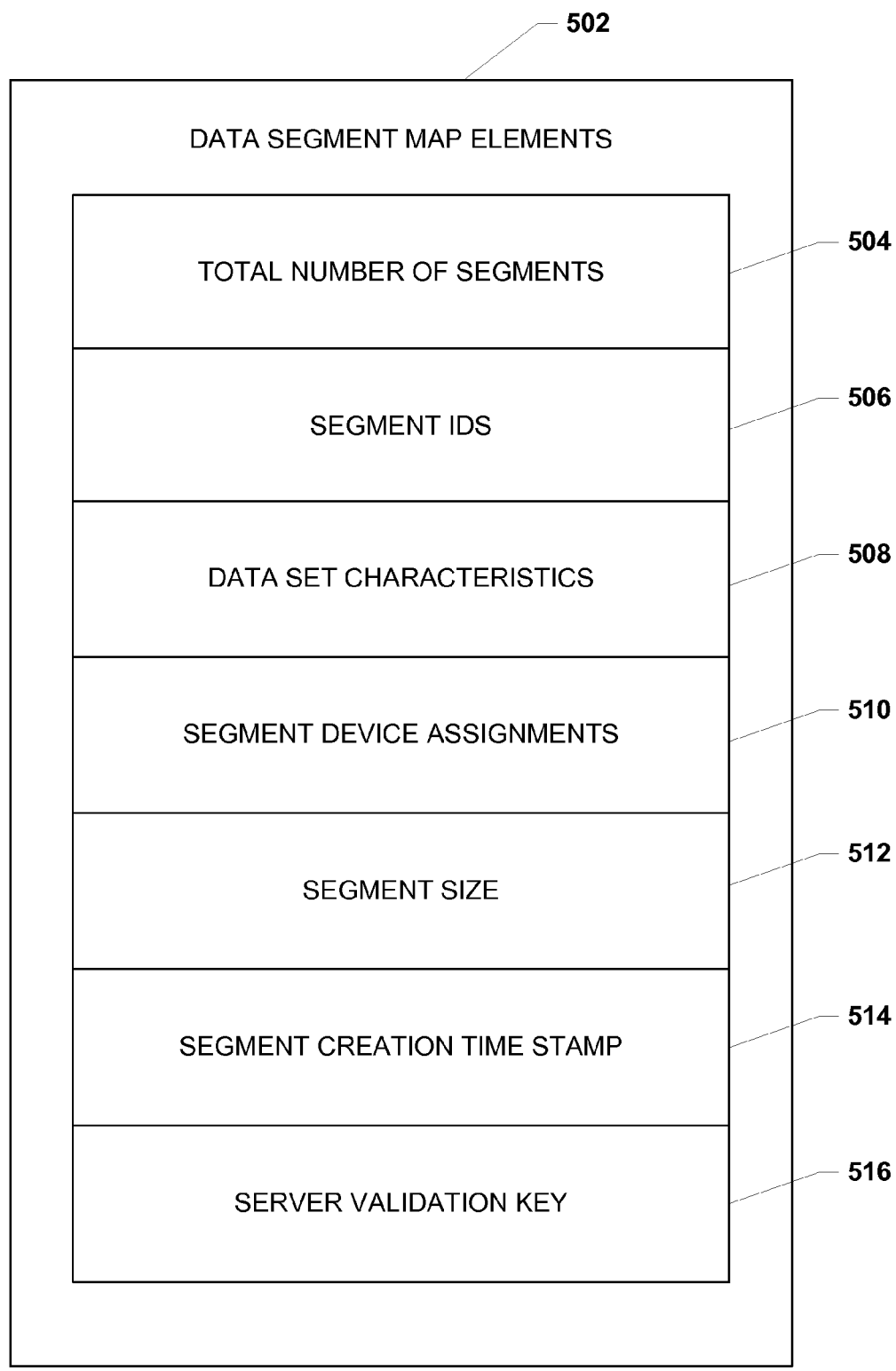
FIG. 5 is a data structure diagram of example data segment map elements.

FIG. 5 is a data structure diagram illustrating potential data segment map elements 502. Data segment map elements 502 may include the total number of segments 504, the segment IDs 506, data set characteristics 508, segment device assignments 510, segment size 512, a segment creation time stamp 514, and a server validation key 516. The data segment map elements 502 may be used individually or in combination by the server 102 or mobile devices to aid in recreating the data set, identifying the data set, or communicating between any of the server 102 and mobile devices. Specifically, a segment creation time stamp 514 may allow mobile devices to ensure they have the most up to date segments. A server validation key 516 may act as a trust/verification tool for mobile devices when communicating together and act as a security feature. The server validation key 516 may be provided by the server 102 as a way to validate the segments and/or mobile computing device to other mobile computing devices. The server validation key 516 may be an encrypted key provided from the server 102. A mobile computing device receiving a server validation key 516 from a second mobile computing device may be able to use the serve validation key 516 to confirm that the information on the second mobile computing device actually originated at the server 102.

Figure 6:
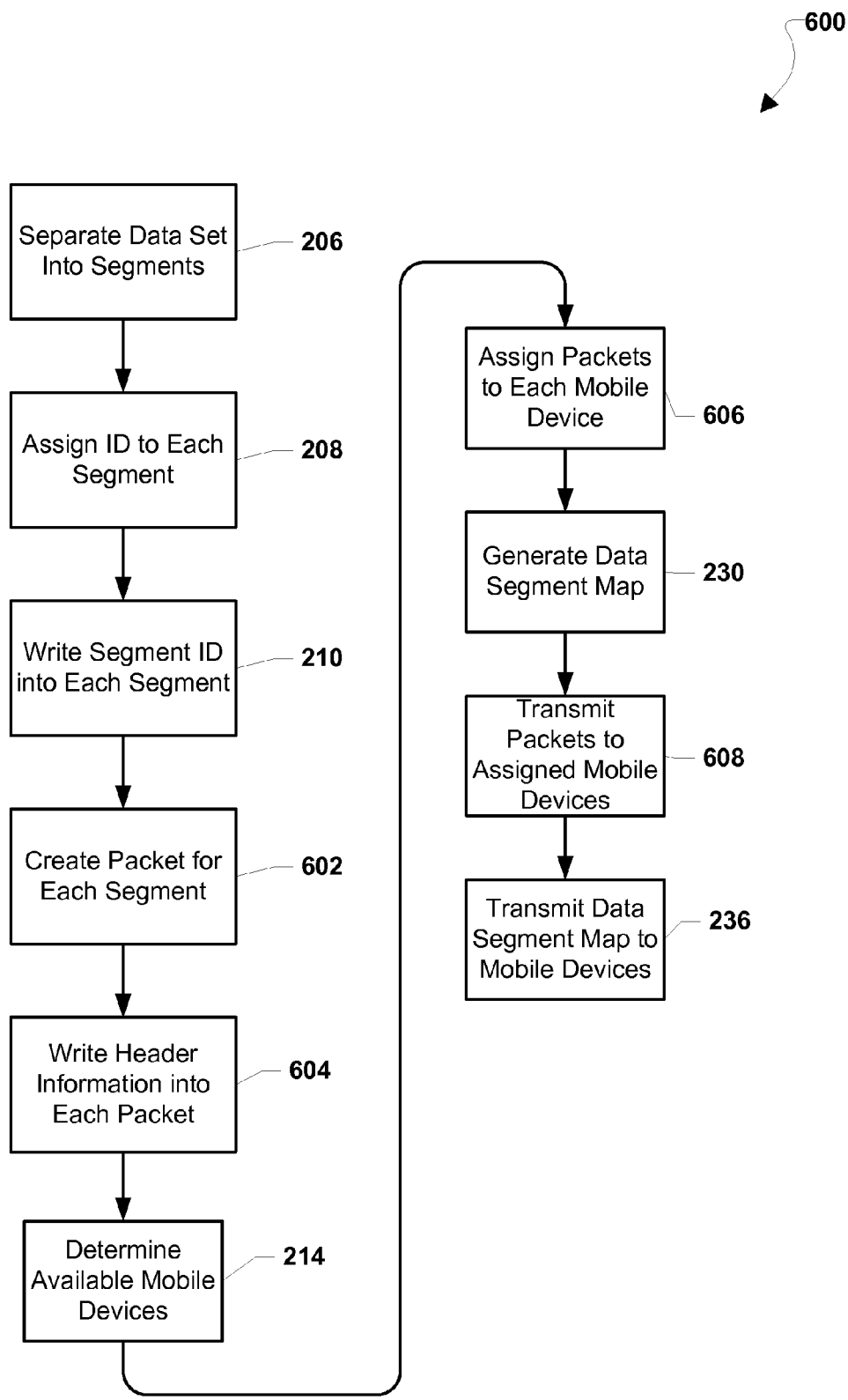
FIG. 6 is another process flow diagram illustrating a second embodiment method for optimizing data delivery.

FIG. 6 illustrates an embodiment method 600 for optimizing data delivery similar to method 200 described above with reference to FIG. 2, except that at block 602 the server 102 may create a packet for each segment. At block 604 the server 102 may write header information into each packet. Header information may include various types of information as will be discussed further below. At block 214 the server 102 may determine available mobile computing devices. At block 606 the server 102 may assign packets to each mobile computing device in a manner similar to how data segments were assigned in block 228 discussed above. At block 230 the server 102 may generate a data segment map. At block 608 the server 102 may transmit the packets to their assigned mobile computing devices. At block 236 the server 102 may transmit the data segment map to the mobile computing devices.

Figure 7:
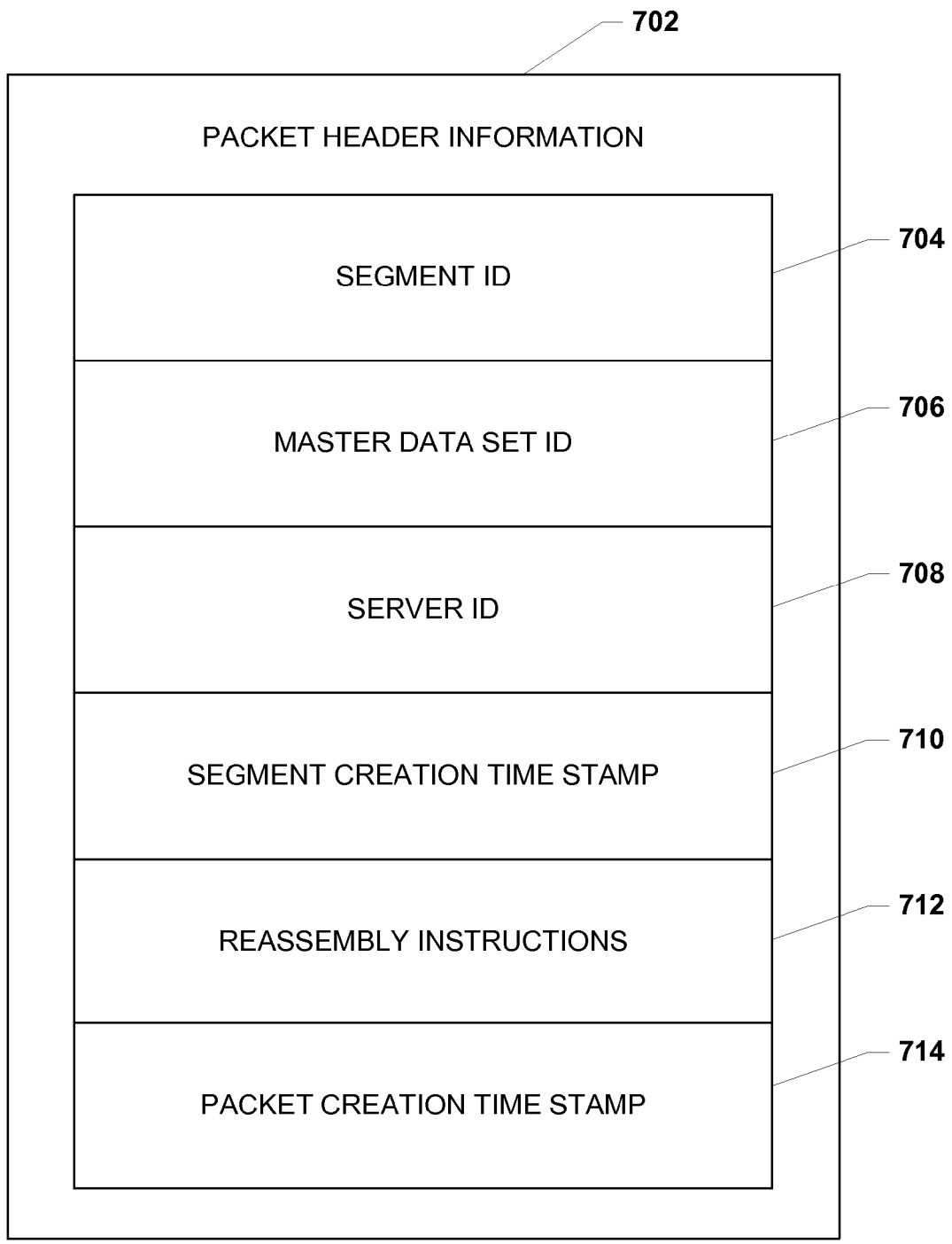
FIG. 7 is a data structure diagram of example packet header information.

FIG. 7 is a data structure diagram illustrating potential packet header information 702. Packet header information 702 may include the segment ID 704, a master data set ID 706, a server ID 708, a segment creation time stamp 710, reassembly instructions 712, and a packet creation time stamp 714. A master data set ID 706 may be a unique identification created by the server 102 to identify the overall data set from which the segments were created. The server ID 708 may be a unique identification associated with the server 102 that created the packet. The reassembly instructions 712 may be instructions controlling the order in which packets are intended to be unpacked or the placement in the overall data set of the segment contained in the packet. The packet creation time stamp 714 may be an indication of the time at which the packet was created.

Figure 8:
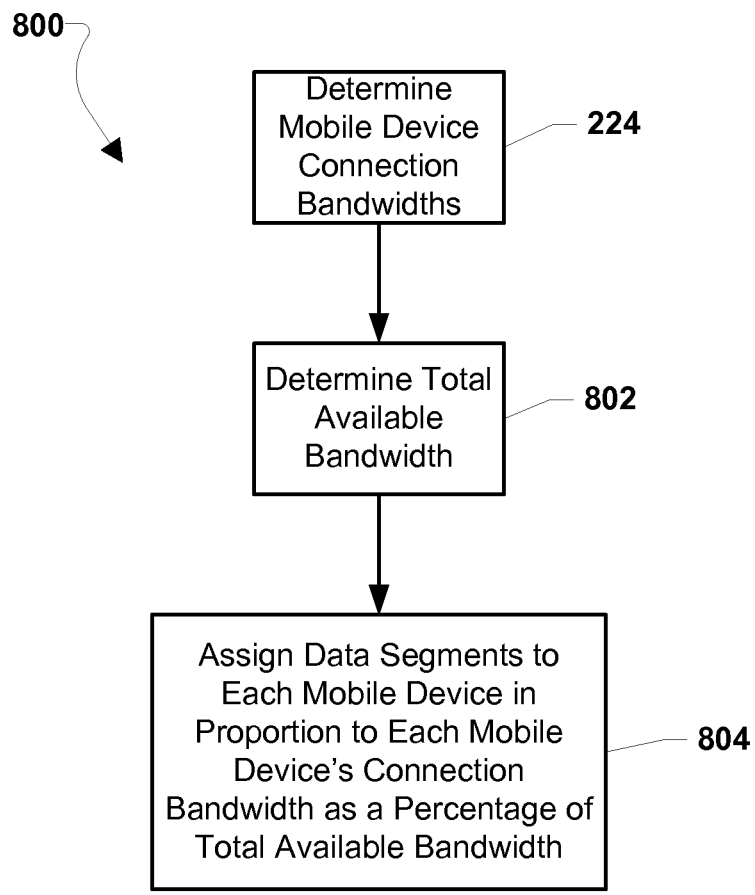
FIG. 8 is another process flow diagram illustrating a third embodiment method for optimizing data delivery.

FIG. 8 illustrates an embodiment method 800 for optimizing data delivery which may be used in conjunction with method 200 described above with reference to FIG. 2. A discussed above in block 224, the server 102 may determine the mobile computing device connection bandwidths for each mobile computing device. At block 802, the server 102 may determine the total available bandwidth for all the mobile computing devices. As an example, the server 102 may sum the individual mobile computing device connection bandwidths to determine the total available bandwidth for all the mobile computing devices. At block 804 the server 102 may assign data segments to each mobile computing device in proportion to each mobile computing device's connection bandwidth as a percentage of the total available bandwidth. As an example a mobile computing device with a connection to the server representing 70% of the total available bandwidth between the two mobile computing devices may be assigned 70% of the data segments, while a mobile computing device with a connection to the server representing 30% of the total available bandwidth may be assigned 30% of the data segments. The server 102 may then transmit the data segments to the respective mobile computing devices as per methods 200 or 600 described above.

Figure 9:
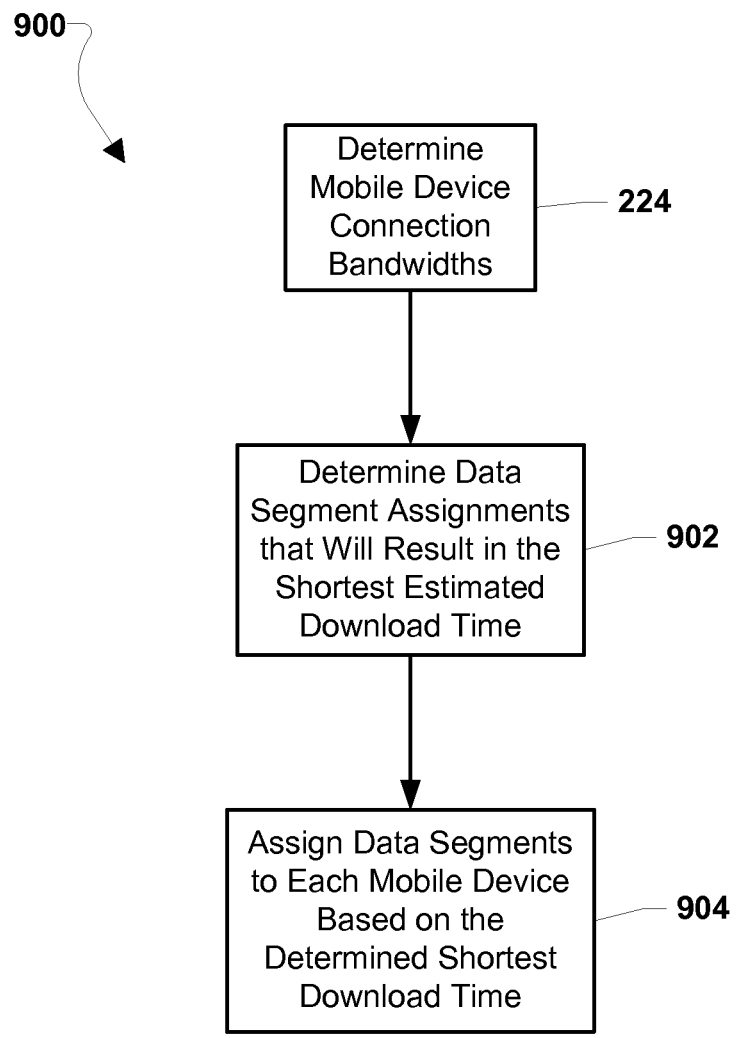
FIG. 9 is another process flow diagram illustrating a fourth embodiment method for optimizing data delivery.

FIG. 9 illustrates an embodiment method 900 for optimizing data delivery which may be used in conjunction with method 200 described above with reference to FIG. 2. As discussed above in block 224 the server 102 may determine the mobile computing device connection bandwidths. At block 902 the server 102 may determine data segment assignments that will result in the shortest estimated download time. At block 904 the server 102 may assign the data segments to each mobile computing device based on the determined shortest download time. The server 102 may then transmit the data segments to the respective mobile computing devices as per methods 200 or 600 described above.

Figure 10:
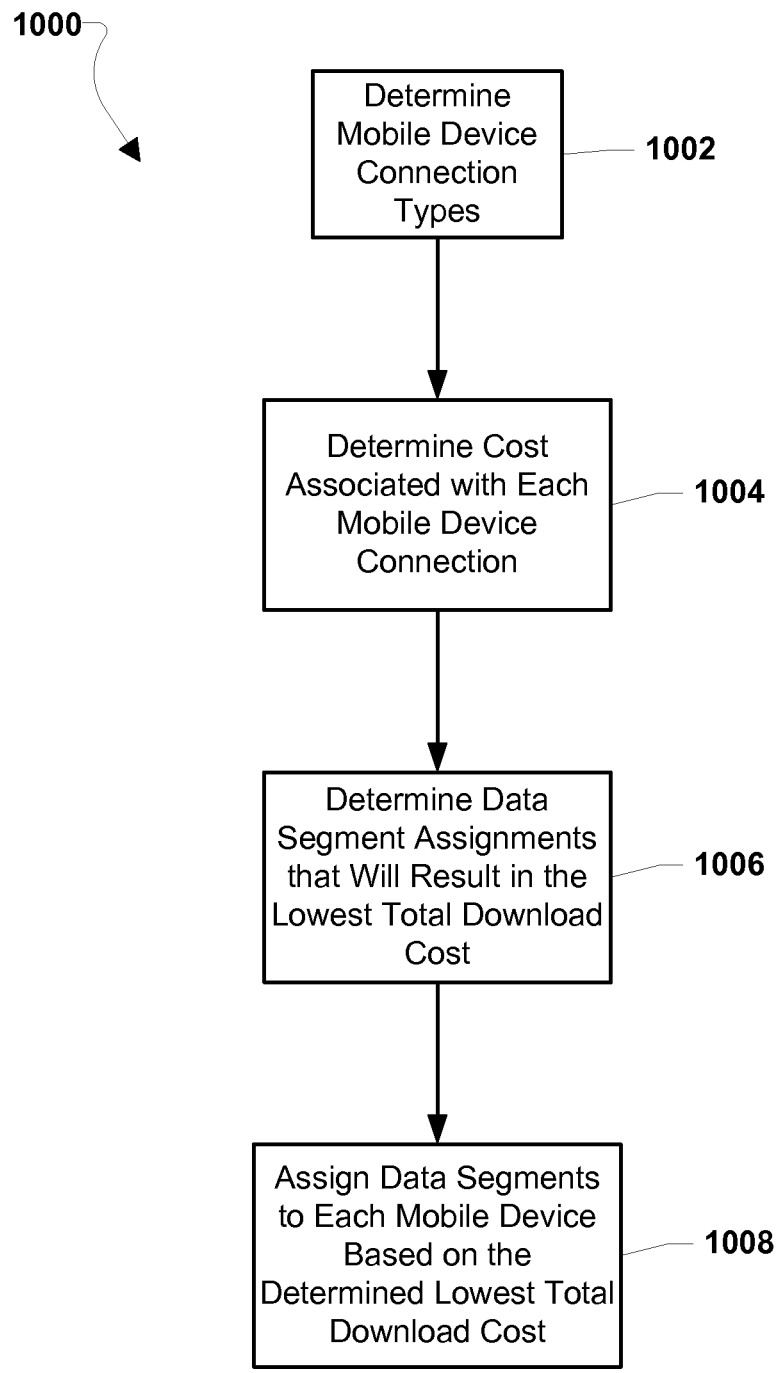
FIG. 10 is another process flow diagram illustrating a fifth embodiment method for optimizing data delivery.

FIG. 10 illustrates an embodiment method 1000 for optimizing data delivery which may be used in conjunction with method 200 described above with reference to FIG. 2. At block 1002 the server 102 may determine the mobile computing device connection types. As an example, a connection between the server 102 and a smart phone 104 may be a 3G connection, and a connection between the server 102 and a laptop computer 106 may be a Wi-Fi connection. At block 1004 the server 102 may determine a cost associated with each mobile computing device connection. As an example, the server 102 may be provided information that a 3G connection results in a fee being charged to a user for data transmitted over the connection and that no fee is charged for data transmitted over a Wi-Fi connection. At block 1006 the server 102 may determine data segment assignments that will result in the lowest total download cost. At block 1008 the server 102 may assign data segments to each mobile computing device based on the determined lowest total download cost. In this manner, a server 102 implementing method 1000 may operate in a cost saving mode. The server 102 may then transmit the data segments to the respective mobile computing devices as per methods 200 or 600 described above.

Figure 11:
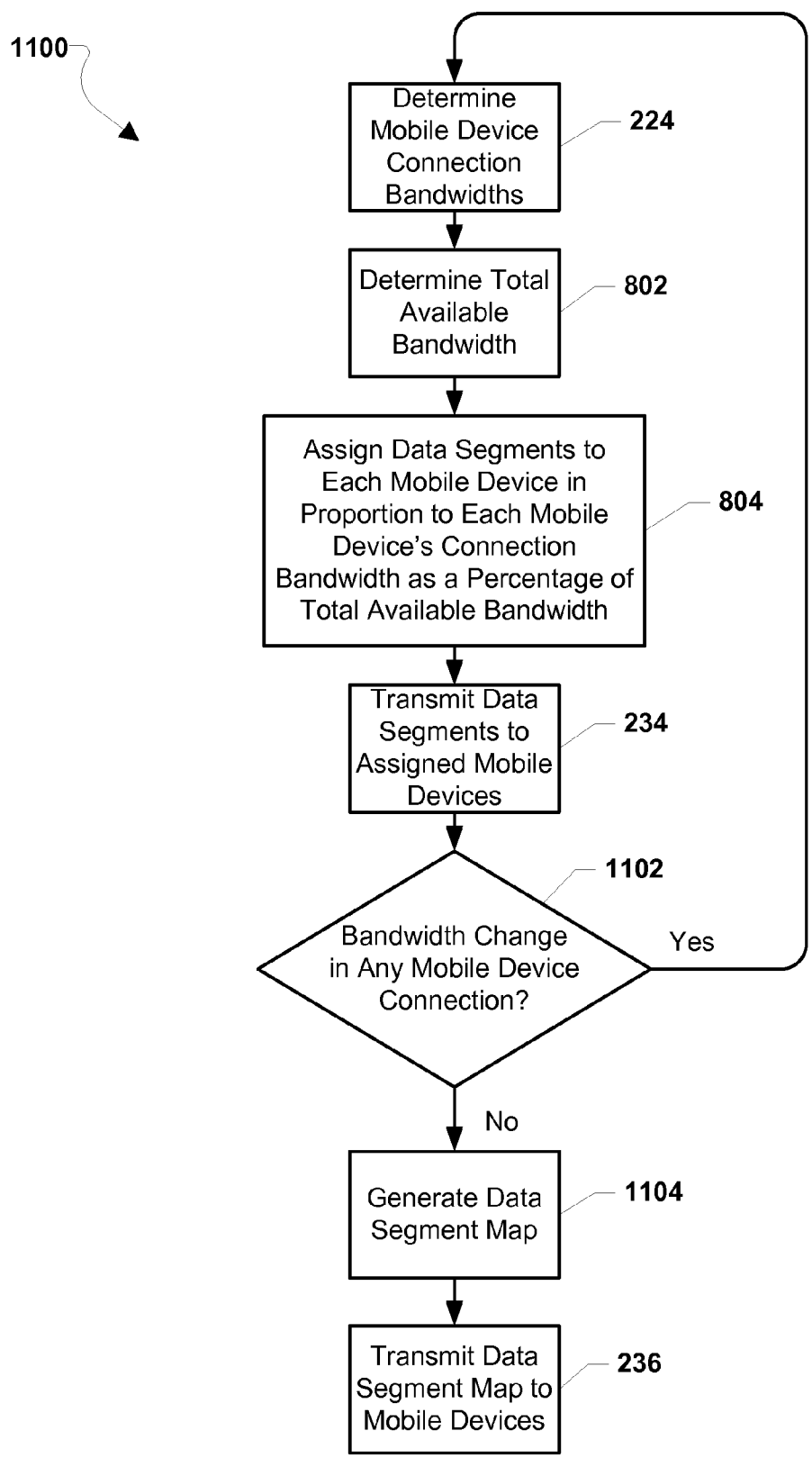
FIG. 11 is another process flow diagram illustrating a sixth embodiment method for optimizing data delivery.

FIG. 11 illustrates an embodiment method 1100 for optimizing data delivery similar to methods 200 and 800 above described with reference to FIGS. 2 and 8, except that data segmentation may address changes in mobile computing device connection bandwidth. As discussed above, at block 234 the server 102 may transmit the data segments to the assigned mobile computing devices. At determination block 1102 the server 102 may determine if a bandwidth change in any mobile computing device connection has occurred. If a bandwidth change has occurred (i.e., determination block 1102="Yes"), at block 224 the server 102 may again determine the mobile computing device connection bandwidths. At block 802 the server 102 may again determine the total available bandwidth. At block 804 the server 102 may again assign data segments to each mobile computing device in proportion to each mobile computing device's connection bandwidth as a percentage of total available bandwidth, and at block 234 the server 102 may transmit the data segments to their now potentially newly assigned mobile computing devices. In this manner, the server 102 may continually adjust the assignment of data segments as bandwidth changes during data segment transmission.

If the bandwidth does not change in any mobile computing device (i.e., determination block 1102="No"), at block 1104 the server 102 may generate a data segment map. In this manner, the data segment map may not be generated until the data segment assignments are finalized. At block 236, the server 102 may transmit the data segment map to the mobile devices.

Figure 12:
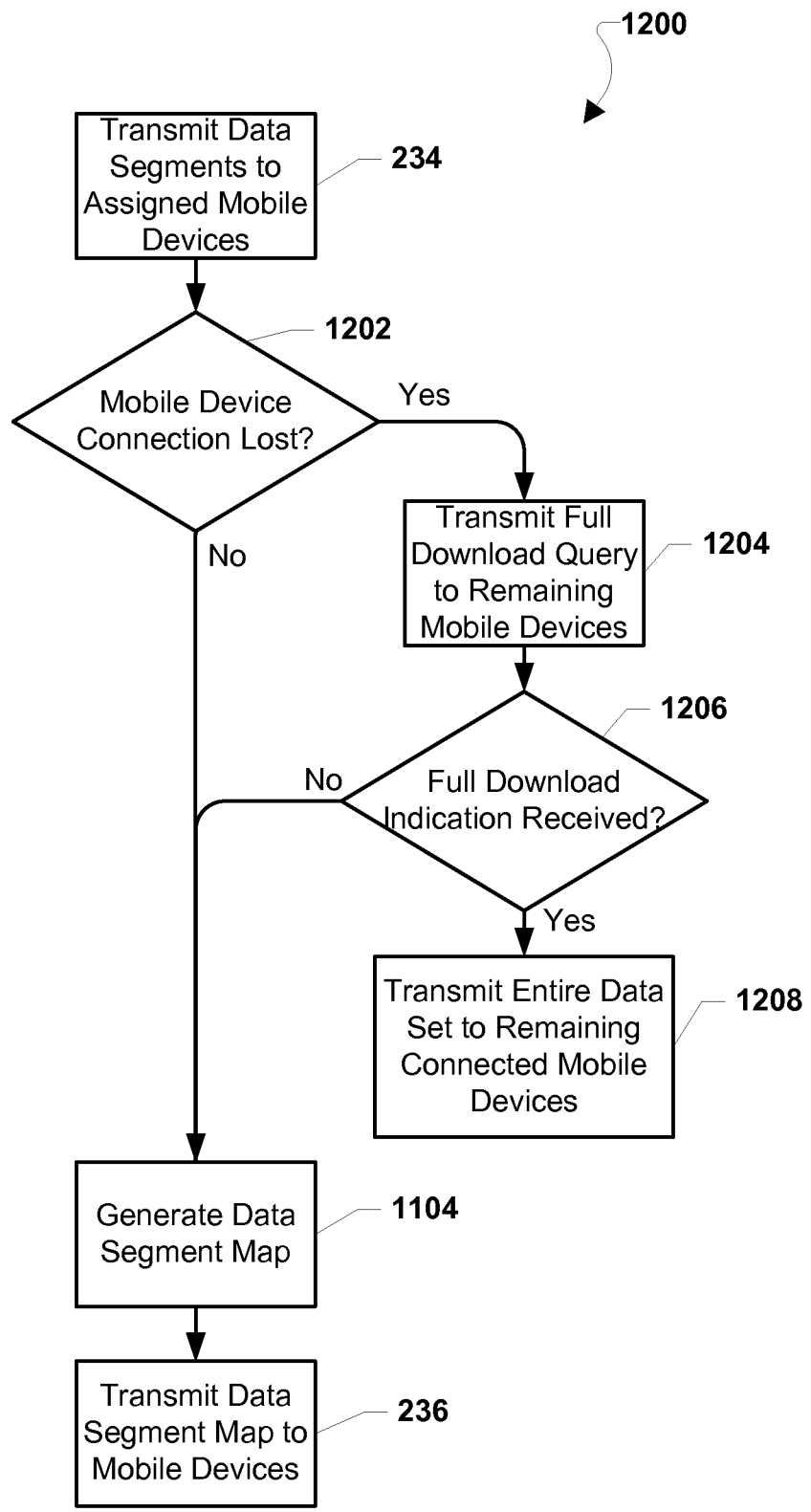
FIG. 12 is another process flow diagram illustrating a seventh embodiment method for optimizing data delivery.

FIG. 12 illustrates an embodiment method 1200 for optimizing data delivery similar to method 1100 described above with reference to FIG. 11, except that data segmentation may compensate for the loss of a mobile computing device connection. As discussed above, at block 234 the server 102 may transmit data segments to the assigned mobile computing devices. At determination block 1202 the server may determine if a mobile computing device connection is lost. If a mobile computing device connection is lost (i.e., determination block 1202="Yes"), at block 1204 the server 102 may transmit a full download query to the remaining mobile computing devices. As an example, a full download query may be an indication to an application running on a mobile computing device to prompt the user to approve or disapprove the full download of the entire data set. If a mobile computing device connection is not lost (i.e., determination block 1202="No"), at block 1104 the server 102 may generate a data segment map and at block 235 the server 102 may transmit the data segment map to the mobile computing devices. The server 102 may then transmit the data segments to the respective mobile computing devices as per methods 200 or 600 described above.

At determination block 1206 the server 102 may determine whether a full download indication is received. As an example, a full download indication may be a message received from an application running on a mobile computing device indicating that the user requests a full download of the entire data set. If a full download indication is received (i.e., determination block 1206="Yes"), at block 1208 the server may transmit the entire data set to the remaining connected mobile computing devices. If a full download indication is not received (i.e., determination block 1206="No"), at block 1104 the server 102 may generate a data segment map and at block 235 the server 102 may transmit the data segment map to the mobile computing devices. The server 102 may then transmit the data segments to the respective mobile computing devices as per methods 200 or 600 described above.

Figure 13A:
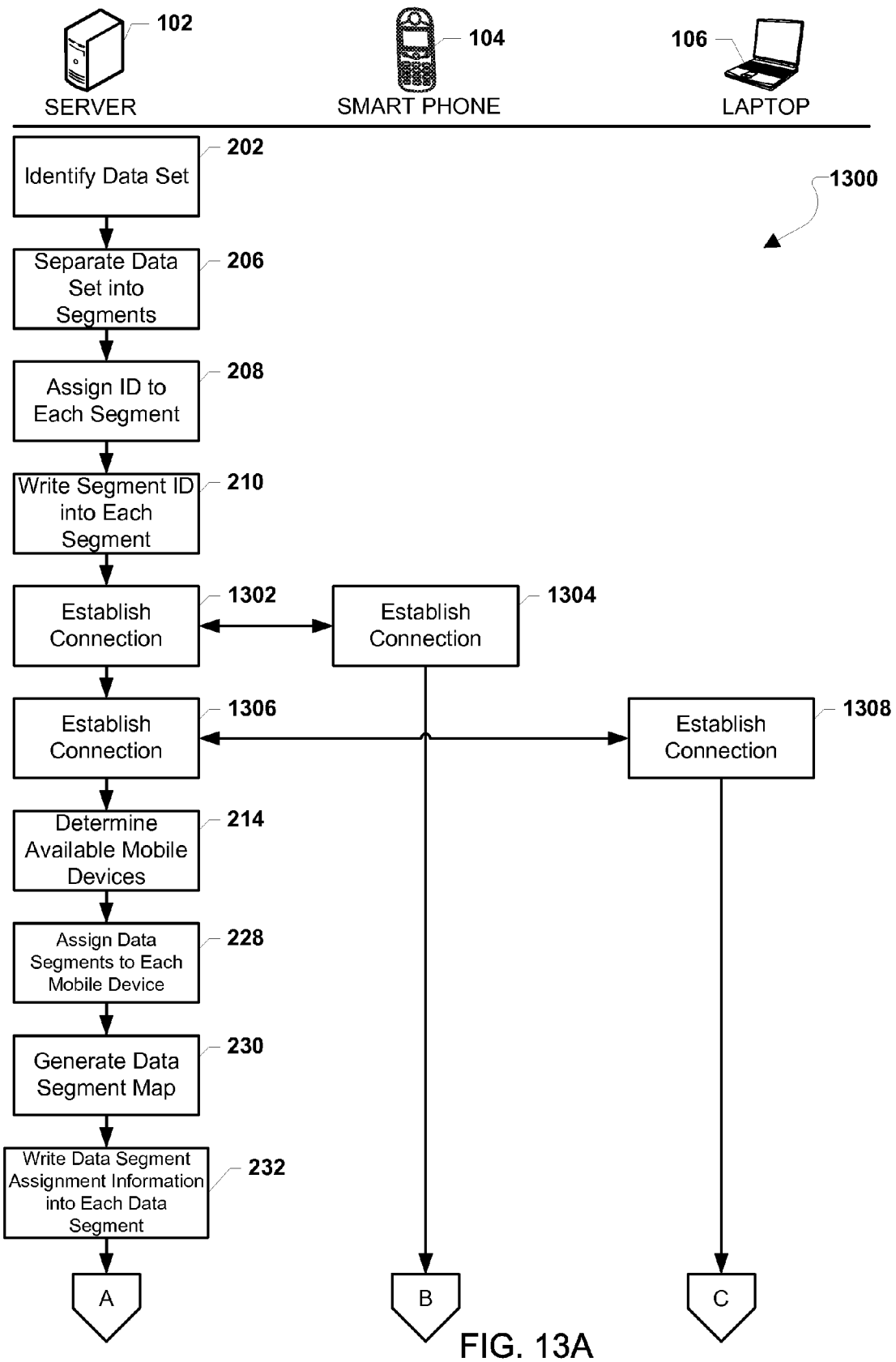
FIGS. 13A and 13B are process flow diagrams illustrating an embodiment method for managing interactions between computing devices to optimize data delivery.
Figure 13B:
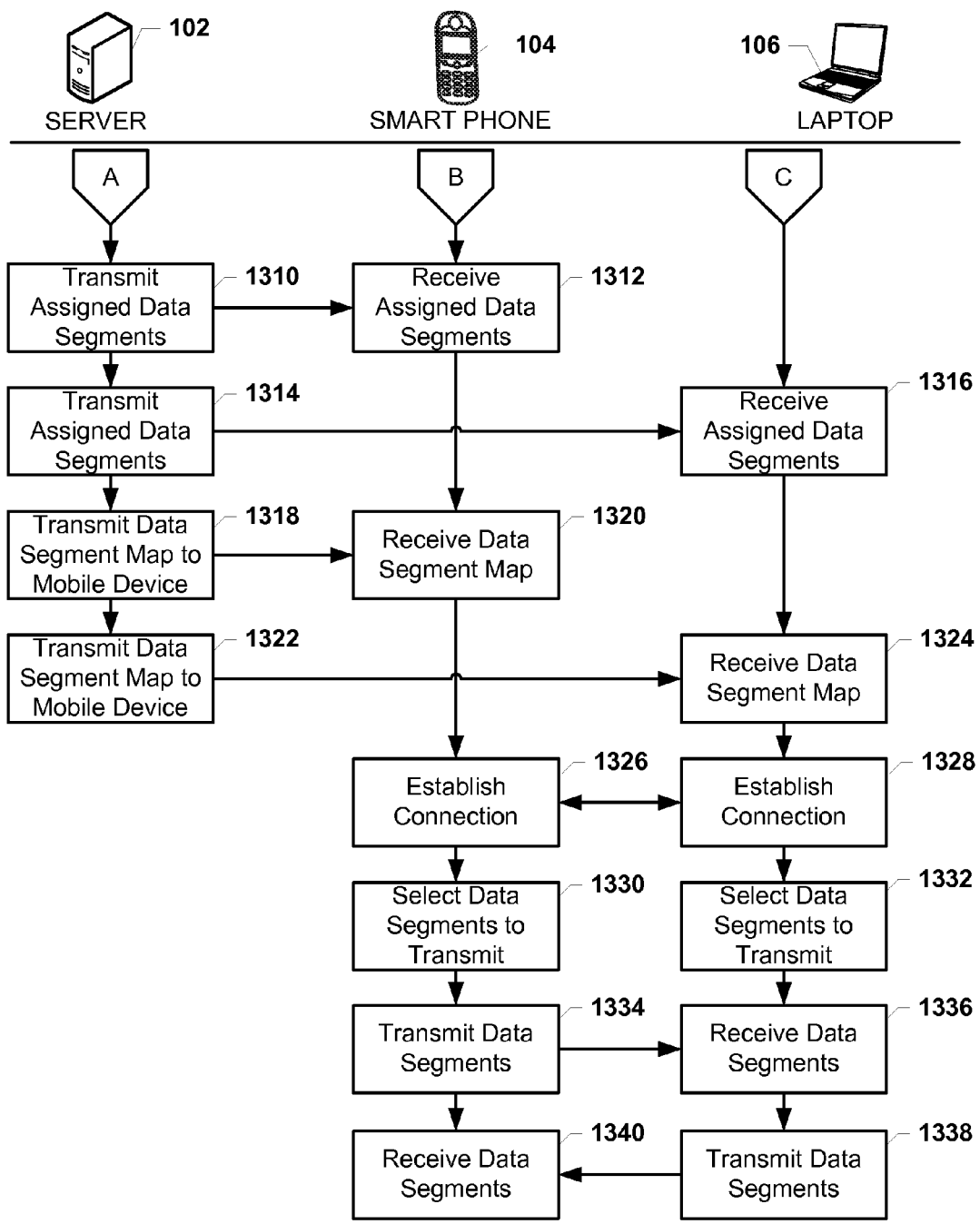

FIGS. 13A and 13B illustrate another embodiment method 1300 for managing interactions between a server 102, a smart phone 104, and a laptop computer 106 to optimize data delivery. At blocks 202, 206, 208, and 210 the server 102 may perform operations of method 200 described above with reference to FIG. 2. At block 1302 and block 1304 the server 102 and the smart phone 104 may establish a data communication connection. The connection may be any connection suitable for transmitting data, such as those connections discussed previously in relation to FIG. 1. At block 1306 and block 1308 the server 102 and laptop computer 106 may establish a data communication connection. The connection may be any connection suitable for transmitting data, such as those connections discussed previously in relation to FIG. 1. At blocks 214, 228, 230, and 232 the server 102 may perform operations of method 200 described above with reference to FIG. 2.

At block 1310 the server 102 may transmit the assigned data segments to the smart phone 104. At block 1312 the smart phone 104 may receive its assigned data segments. At block 1314 the server 102 may transmit assigned data segments assigned to the laptop computer 106. At block 1316 the laptop computer 106 may receive its assigned data segments. At block 1318 the server 102 may transmit the data segment map to the smart phone 104. At block 1320 the smart phone 104 may receive the data segment map. At block 1322 the server 102 may transmit the data segment map to the laptop computer 106. At block 1324 the laptop computer 106 may receive the data segment map.

At block 1326 and block 1328 the smart phone 104 and the laptop computer 106 may establish a data communication connection with each other. The connection may be any connection suitable for transmitting data, such as those connections discussed previously in relation to FIG. 1. At block 1330 the smart phone 104 may determine what data segments to transmit to the laptop computer 106. The determination may be based at least in part on information in the data segment map received by the smart phone 104. At block 1332 the laptop computer 106 may select data segments to transmit to the smart phone 104. The selection may be based at least in part on the information in the data segment map received by the laptop computer 106. At block 1334 the smart phone 104 may transmit selected data segments to the laptop computer 106 and at block 1336 the laptop computer 106 may receive the data segments. At block 1338 the laptop computer 106 may transmit selected data segments to the smart phone 104, and at block 1340 the smart phone 104 may receive the data segments. In this manner, the full data set resident on the server 102, may be assembled in both the smart phone 104 and the laptop computer 106.

Figure 14:
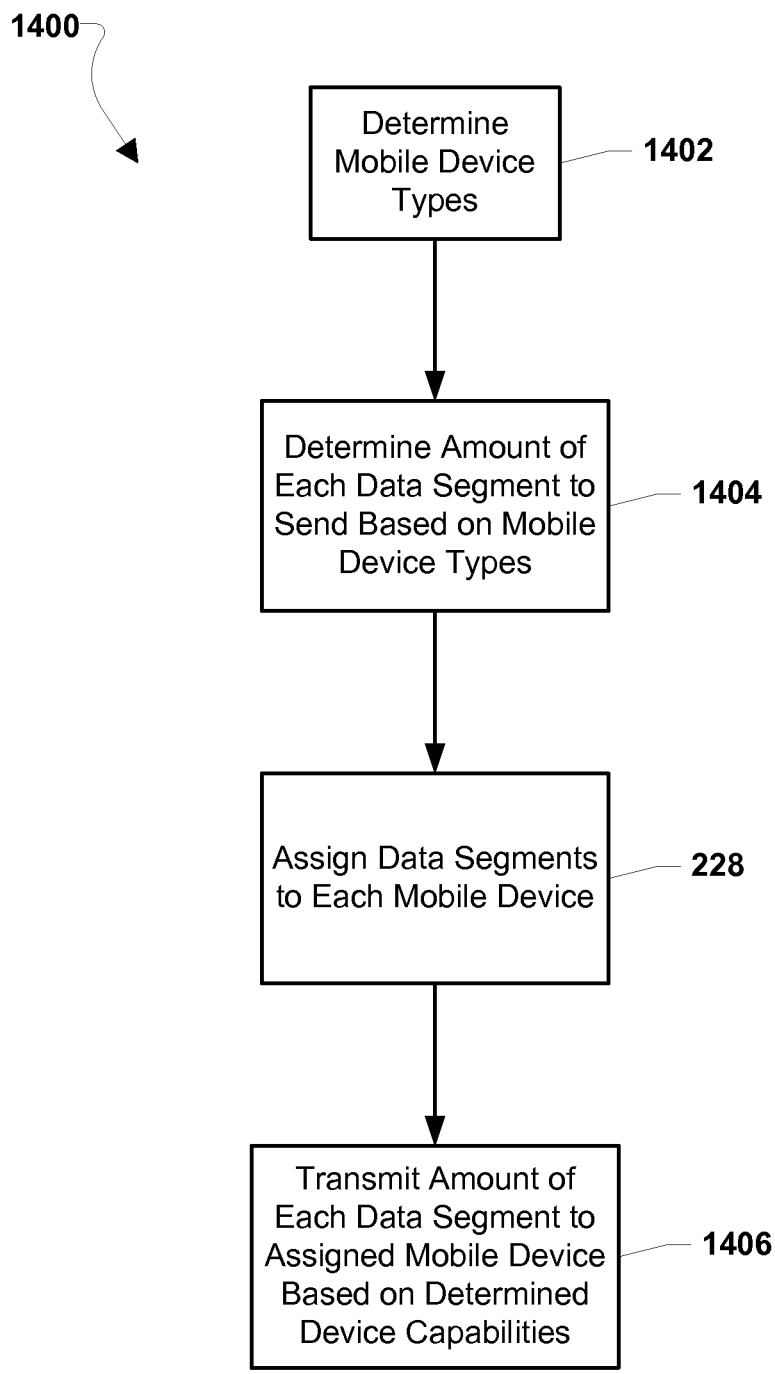
FIG. 14 is another process flow diagram illustrating an eighth embodiment method for optimizing data delivery.

FIG. 14 illustrates an embodiment method 1400 for optimizing data delivery which may be used in conjunction with method 200 describe above with reference to FIG. 2. At block 1402 the server 102 may determine the mobile computing device types with which the server 102 has established connections. As an example, the server 102 may determine that the mobile computing devices are two different types of devices, i.e. a smart phone 104, and a laptop computer 106. At block 1404 the server 102 may determine the amount of each data segment to send based on the mobile computing device types. In this manner the server may determine a portion of the data to be sent to each mobile computing device based on the type of device. As an example, a smart phone 104 may only be able to receive and display the first three lines of an e-mail message. When the server 102 determines that the smart phone 104 is connected, the server 102 may determine that only a limited amount of the data segment (i.e., the first three lines of the e-mail message) should be sent to the smart phone 104. In block 228 the server 102 may assign data segments to each mobile device. In block 1406 the server 102 may transmit the appropriate amount of each of the data segments assigned to the mobile computing devices based on the determined device capabilities. In this manner only a portion of the data segment (i.e., the determined amount) may be transmitted to a mobile computing device.

Figure 15:
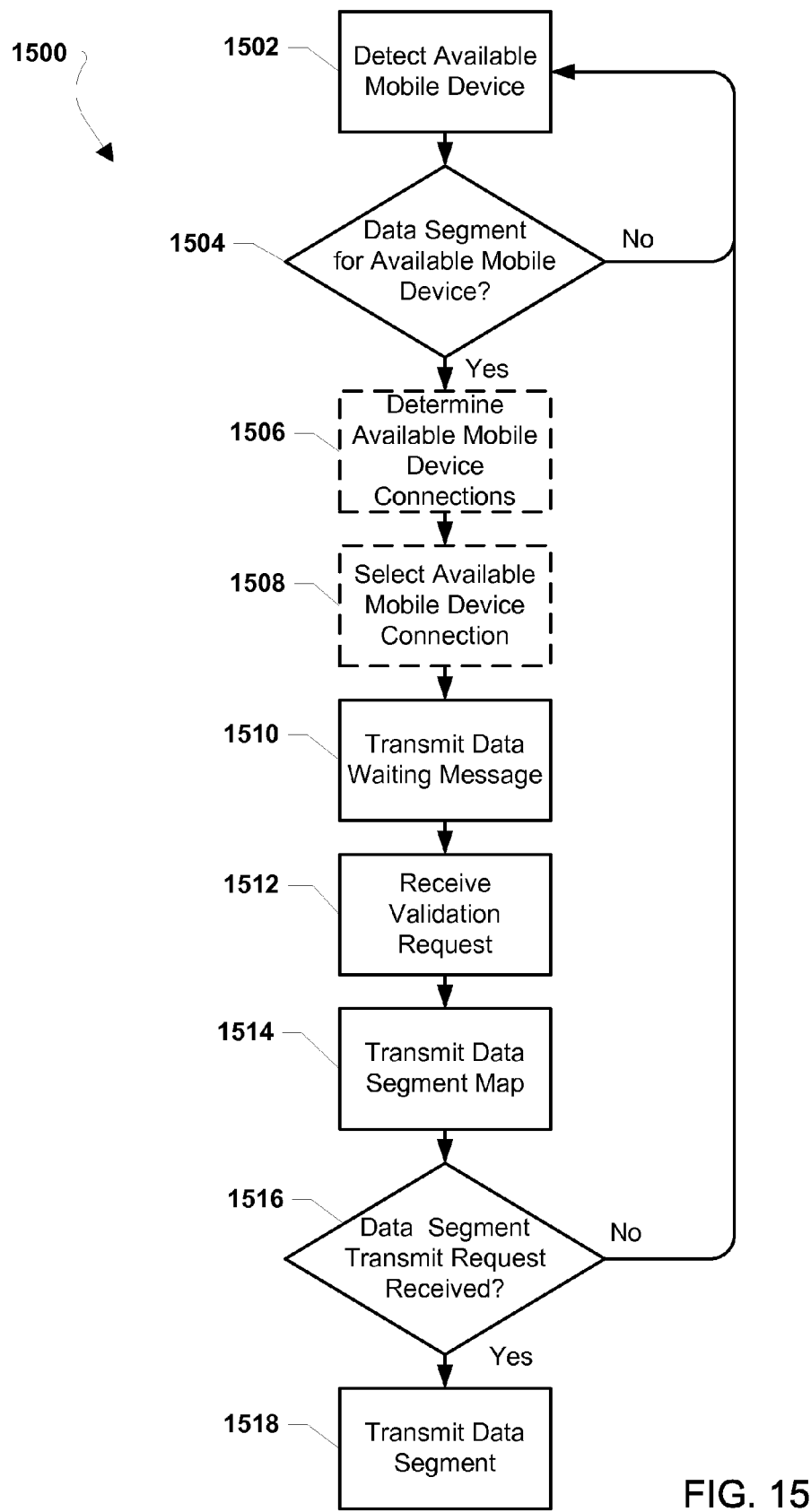
FIG. 15 is a process flow diagram illustrating an embodiment method for synchronizing the transmission of data segments.

FIG. 15 illustrates an embodiment method 1500 for synchronizing the transmission of data segments from a first computing device to a second computing device. As an example, the method 1500 may be implemented between two mobile computing devices, such as a smart phone 104 and a laptop computer 106. While discussed in relation to two mobile computing devices (e.g., the smart phone 104 and the laptop computer 106) the method 1500 may be implemented among any number of computing devices, mobile or otherwise. In block 1502 a first mobile computing device, such as a smart phone 104, may detect an available data communication link to another mobile computing device, such as a laptop computer 106. The first mobile computing device may detect the availability of the data link to the second mobile computing device through a previously established connection such as a Bluetooth connection. At determination block 1504 the first mobile computing device may determine if it has a data segment for the second mobile computing device. As an example, the determination at block 1504 may be made by comparing a device ID for the laptop computer 106 to a data segment map resident in a memory of the smart phone 104 which may indicate whether a data segment should be provided to the laptop computer 106. If the first mobile computing device does not have a data segment for the second mobile computing device (i.e., determination block 1504="No"), the first mobile computing device may return to block 1502 to await detection of another mobile computing device.

If there is a data segment for the second mobile computing device (i.e., determination block 1504="Yes"), in an optional embodiment at block 1506 the first mobile computing device may determine the available mobile device data communication link connections to the second mobile computing device. Mobile computing devices may have the ability to establish more than one data communication link, and more than one data communication link may be established between the first and second mobile computing devices. As an example the smart phone 104 may determine there is both a Wi-Fi connection and a BlueTooth connection with the laptop computer 106. At block 1508, in this optional embodiment, the first mobile computing device may select an available mobile device data communication link connection established between the first and second mobile computing device. As an example, at block 1508 the smart phone 104 may select the BlueTooth connection. Selections of communication data link connections may be made in any manner, and may be made based on considerations similar to those discussed above in relation to FIGS. 8, 9, and 10, such as cost or speed.

At block 1510 the first mobile computing device may transmit a data waiting message to the second mobile computing device. The data waiting message may alert the second device that the first device has a data segment intended for a second device. Additionally, a data waiting message may include a listing of data segments intended for the second mobile computing device, information about a data segment such as its size, creation date, or content type, or any other information related to a data segment intended for the second mobile computing device. At block 1512 the first mobile computing device may receive a validation request from the second mobile computing device. The validation request may be a request from the second mobile computing device in response to the data waiting message. The validation request may be a request for information which may used by the second mobile device to validate the authenticity of the first mobile computing device or to validate the authenticity of the data resident on the first mobile computing device. As an example, the validation request may request the first mobile computing device provide the identity of a server from which the data segment originated. The second mobile computing device may use the identity of the server to validate that the segment originated on an authorized server, and thus a validation request may prevent the unauthorized parties from providing or receiving data.

At block 1514 the first mobile computing device may transmit a data segment map to the second mobile computing device in response to receiving the validation request. The data segment map may contain information to be used by the second mobile computing device to validate the authenticity of the first mobile computing device or to validate the authenticity of the data resident on the first mobile computing device. As an example, the data segment map may contain a server ID to identify the server from which the data segment originated. The second mobile computing device may user the server ID to validate the first mobile computing device (e.g., by comparing the server ID to a stored list of authorized server IDs). At determination block 1516 the first mobile computing device may determine if a data segment transmit request is received. If a data transmit request is not received (i.e., determination block 1516="No"), the first mobile computing device may return to block 1502 to await detection of another mobile computing device. If a data transmit request is received (i.e., determination block 1516="Yes"), at block 1518 the first mobile computing device may transmit the data segment to the second mobile computing device.

Figure 16:
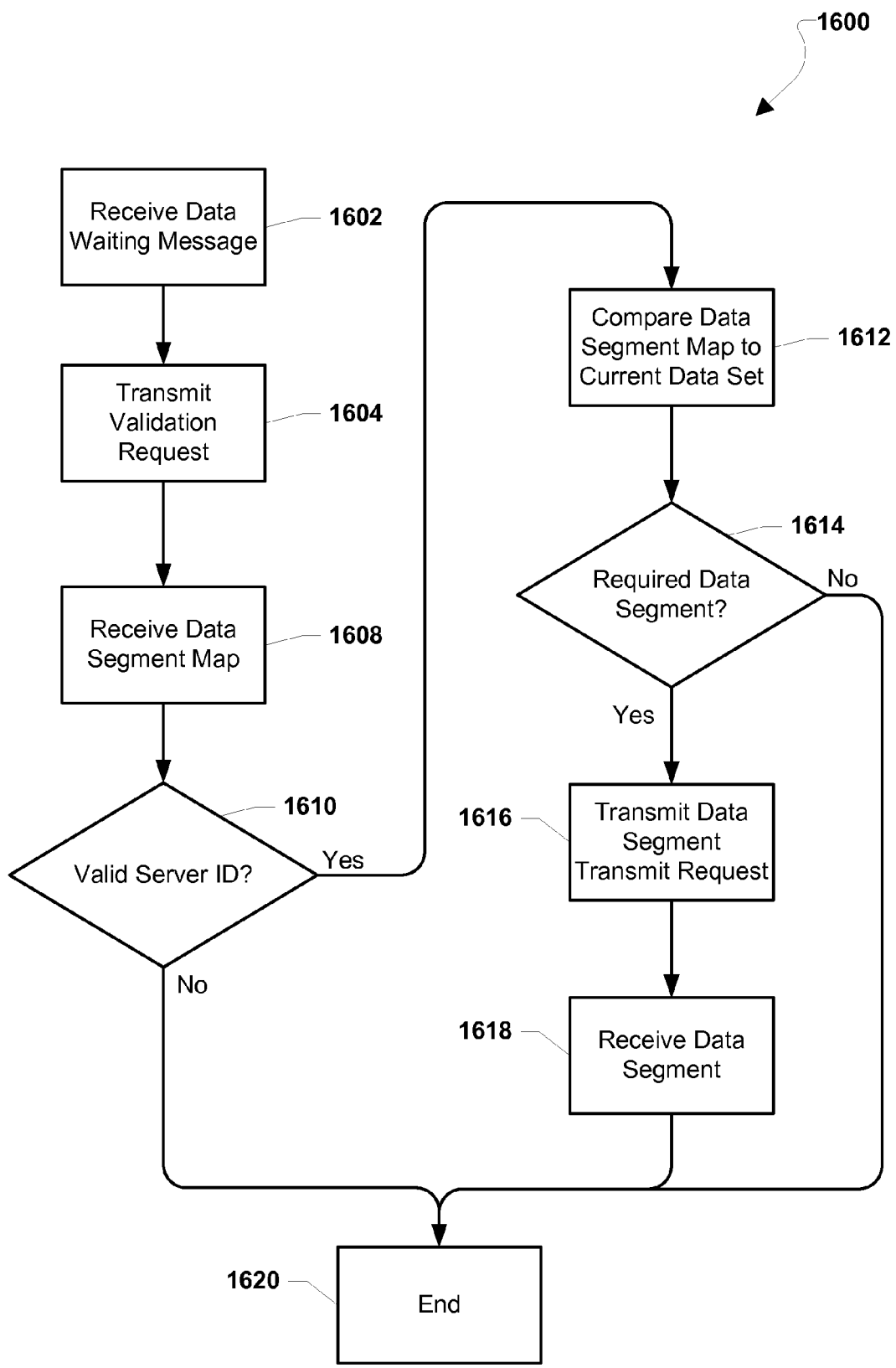
FIG. 16 is a process flow diagram illustrating an embodiment method for synchronizing the receipt of data segments.

FIG. 16 illustrates an embodiment method 1600 for synchronizing the receipt of data segments from a first computing device at a second computing device. As an example, the method 1600 may be implemented by a second mobile computing device operating in conjunction with a first mobile computing device implementing method 1500. As an example, the method 1600 may be implemented between two mobile computing devices, such as first mobile computing device, a smart phone 104 and a second mobile computing device, a laptop computer 106. While discussed in relation to two mobile computing devices (laptop computer 106 and smart phone 104) the method 1600 may be implemented among any number of computing devices, mobile or otherwise. At block 1602 a second mobile computing device, such as laptop computer 106, may receive a data waiting message from a first mobile computing device, such as smart phone 104. As discussed above, the data waiting message may be a message alerting the second device that the first device has a data segment intended for the second mobile computing device. Additionally, a data waiting message may include a listing of data segments intended for the second mobile computing device, information about a data segment such as its size, creation date, or content type, or any other information related to a data segment intended for the second mobile computing device.

At block 1604 the second mobile computing device may transmit a validation request to the first mobile computing device. The validation request may be sent from the second mobile computing device in response to the second mobile computing device receiving the data waiting message. As discussed above, the validation request may be a request for information which may used by the second mobile device to validate the authenticity of the first mobile computing device or to validate the authenticity of the data resident on the first mobile computing device. As an example, the validation request may be a message sent from the laptop computer 106 to the smart phone 104 requesting the smart phone 104 provide a server ID. At block 1608 the second mobile computing device may receive a data segment map from the first mobile computing device which may contain a server ID.

At determination block 1610 the second mobile computing device may determine if the server ID is valid, such as by comparing the server ID in the data segment map to a server ID stored in memory. Other methods may be used to validate the server ID, including the use of encrypted hash techniques well known in the computer arts. If the server ID is not validated (i.e., determination block 1610="No"), at block 1620 the method may end. In this manner, invalid and/or untrusted data may not be received by the second mobile computing device. If the server ID is valid (i.e., determination block 1610="Yes"), at block 1612 the second mobile computing device may compare the data segment map to a current data set resident on the second mobile computing device to determine is any data segments on the first mobile computing device contain data not resident on the second mobile computing device. As an example, the laptop computer 106 may compare the data segment creation time stamps to determine if the data set on the laptop computer 106 is newer than the data set defined by the data segment map.

At determination block 1614 the second mobile computing device may determine if the data segment is required. This determination may be made using the results of the comparison of the data segment to the current data set performed in block 1612 to determine if any data segments on the first mobile computing device contain data not resident on the second mobile computing device. Required data segments may include data not resident on the second mobile computing device or data newer than the data resident on the second mobile computing device. If the data segment is not required (i.e., determination block 1614="No"), at block 1620 the method 1600 may end. As an example, an outdated data segment may not be required. If the data segment is required (i.e., determination block 1614="Yes"), at block 1616 the second mobile computing device may transmit a data segment transmit request to the first mobile computing device requesting the transmission of the data segment. At block 1618 the second mobile computing device may receive the data segment from the first mobile computing device. At block 1620 the method 1600 may end.

Figure 17:
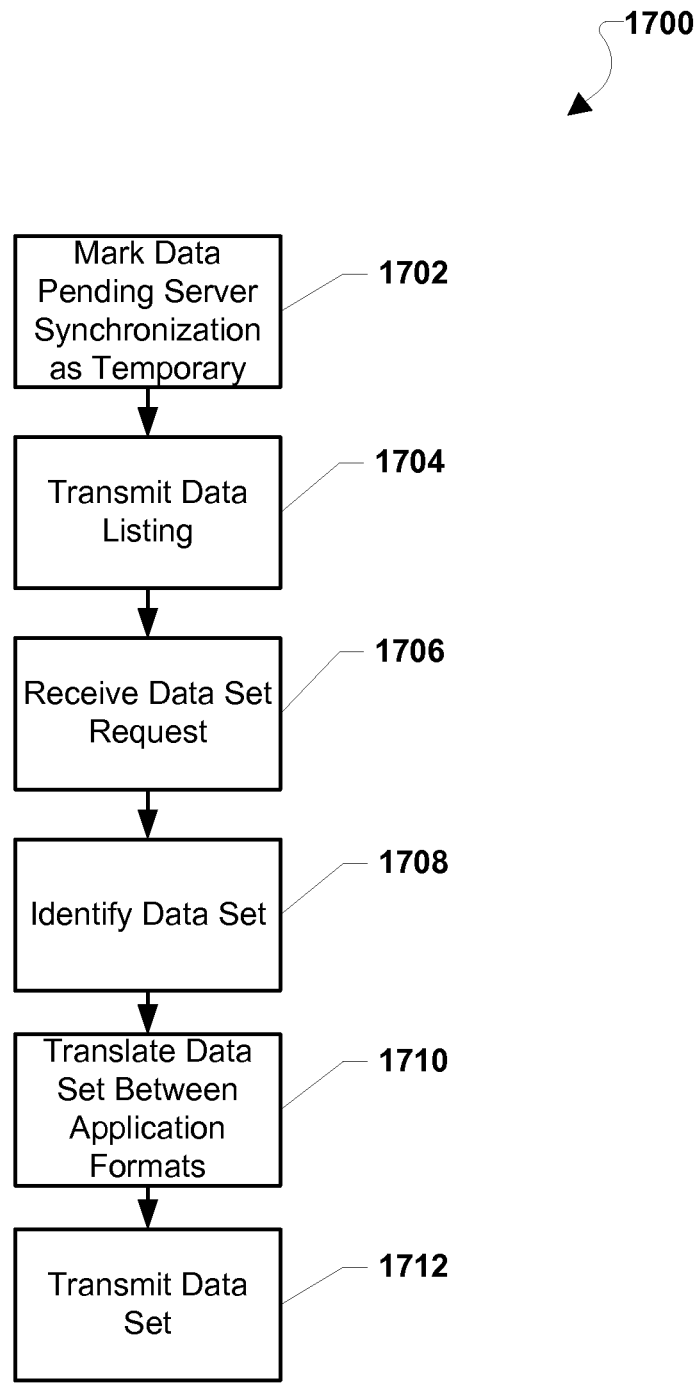
FIG. 17 is a process flow diagram illustrating a first embodiment method for synchronizing a data set.

FIG. 17 illustrates an embodiment method 1700 for synchronizing a data set between a first computing device and a second computing device. As an example, the method 1700 may be implemented between two mobile computing devices, such as a smart phone 104 and a laptop computer 106. While discussed in relation to two mobile computing devices (smart phone 104 and laptop computer 106) the method 1700 may be implemented among any number of computing devices, mobile or otherwise. At block 1702 the first mobile computing device, such as laptop computer 106, may mark data pending server synchronization as temporary. Data pending server synchronization may be data which has been altered in some way since the last data synchronization between the first mobile computing device and a server occurred. Data pending server synchronization may be marked temporary in any manner, including by information written into a file header, a tag added to the data or an index or a pointer file, or by changing a data ID. At block 1704 the first mobile computing device may transmit a data listing to the second mobile computing device, such as the smart phone 104. A data listing may be a listing of data resident on the first mobile computing device, such as an index. The data listing may include an identification of data marked as temporary in block 1702. As an example the laptop computer 106 may transmit the data listing to a smart phone 104 over a communication data link connection established between the laptop computer 106 and the smart phone 104.

At block 1706 the first mobile computing device may receive a data set request from the second mobile computing device. A data set request may identify all or a portion of the data on the data listing which may be required by the second mobile computing device. Additionally, the data set request may include information about the application format for data required by the second mobile computing device. At block 1708 the first mobile computing device may identify the data set required by the second mobile computing device based on the data listing received at block 1706. Identification of the data set may include identifying an application format required by the second mobile computing device. At block 1710 first mobile computing device may translate the data set between application formats. As an example, the data stored on the laptop 106 may be in an application format only suitable for use on the laptop 106. To make use of the data, the smart phone 104 may require the data be translated into an application format suitable for use on the smart phone 104. Therefore, the laptop 106 may translate the data set from an application format for the laptop 106 to an application format for the smart phone 104. At block 1712, the first mobile computing device may transmit the now translated data set to the second mobile computing device. As an example, the laptop computer 106 may transmit the translated data set to the smart phone 104 over a communication data link connection established between the laptop computer 106 and the smart phone 104.

Figure 18:
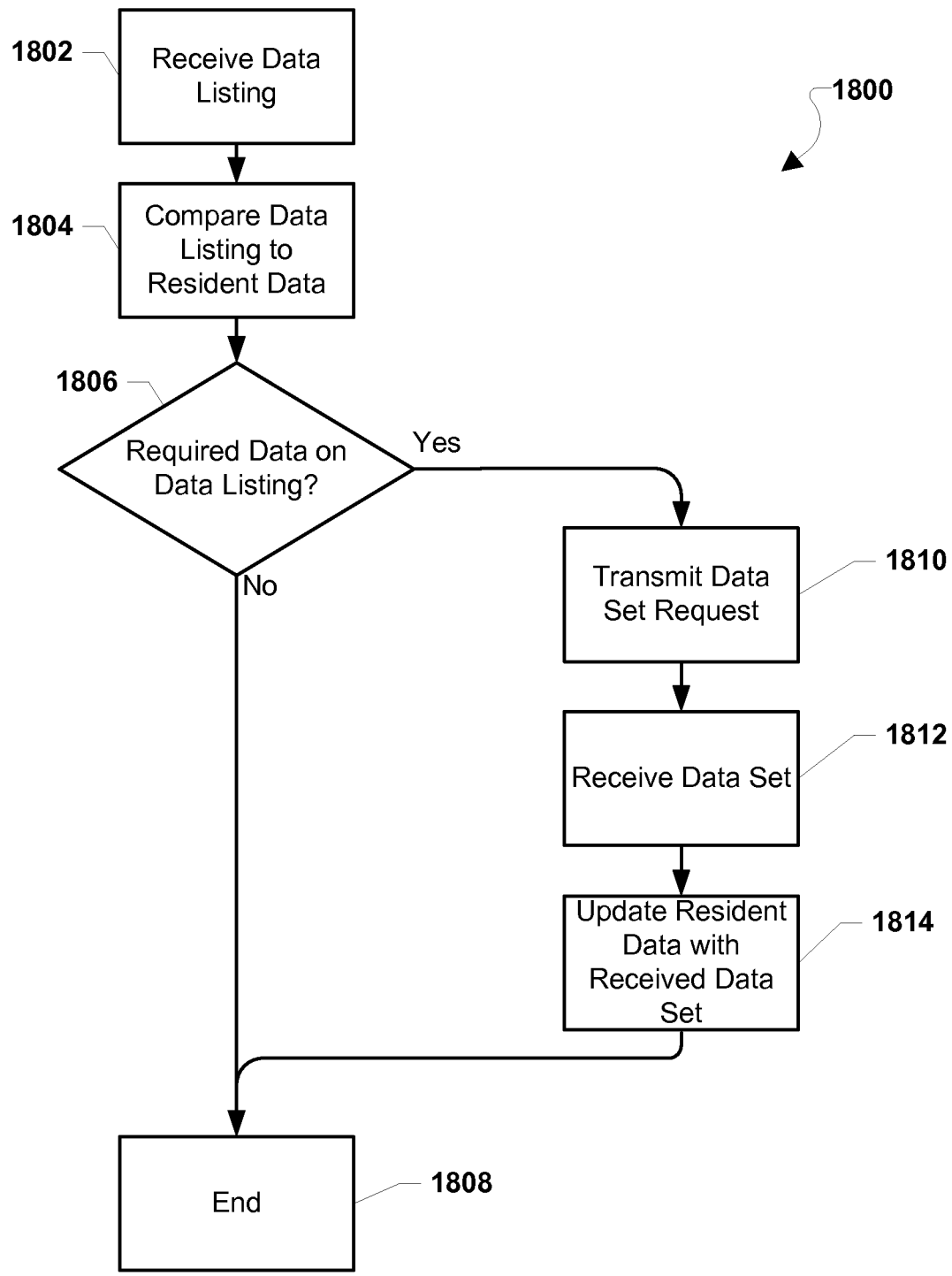
FIG. 18 is another process flow diagram illustrating a second embodiment method for synchronizing a data set.

FIG. 18 illustrates an embodiment method 1800 for synchronizing a data set between a first computing device and a second computing device. As an example, the method 1800 may be implemented by a second mobile computing device operating in conjunction with a first mobile computing device implementing method 1700. As an example, the method 1800 may be implemented between two mobile computing devices, such as first mobile computing device, a laptop computer 106 and a second mobile computing device, a smart phone 104. While discussed in relation to two mobile computing devices (laptop computer 106 and smart phone 104) the method 1800 may be implemented among any number of computing devices, mobile or otherwise. At block 1802 a second mobile computing device, such as the smart phone 104, may receive a data listing from a first mobile computing device, such as the laptop 106. As discussed above, a data listing may be a listing of data resident on the first mobile computing device and may include an identification of data marked as temporary.

At block 1804 the second mobile computing device may compare the data listing to data resident on the second mobile computing device. At determination block 1806 the second mobile computing device may determine if it requires data on the data listing. This determination may be made using the results of the comparison of the data listing to the data resident on the second mobile computing device performed in block 1804. Required data may include data not resident on the second mobile computing device, data newer than the data resident on the second mobile computing device, or data marked as temporary. If data on the data listing is not required (i.e., determination block 1806="No"), at block 1808 the method 1800 may end.

If data on the data listing is required (i.e., determination block 1806="Yes"), at block 1810 the second mobile computing device may transmit a data set request to the first mobile computing device. As discussed above, a data set request may identify all or a portion of the data on the data listing which may be required by the second mobile computing device and may include information about the application format for data required by the second mobile computing device. At block 1812 the second mobile computing device may receive a data set from the first mobile computing device. A data set may include the data requested by the second mobile computing device translated into an application format suitable for use on the second mobile computing device. At block 1814 the second mobile computing device may update the data resident on the second mobile computing device with the received data set. At block 1808 the method 1800 may end.

Figure 19:
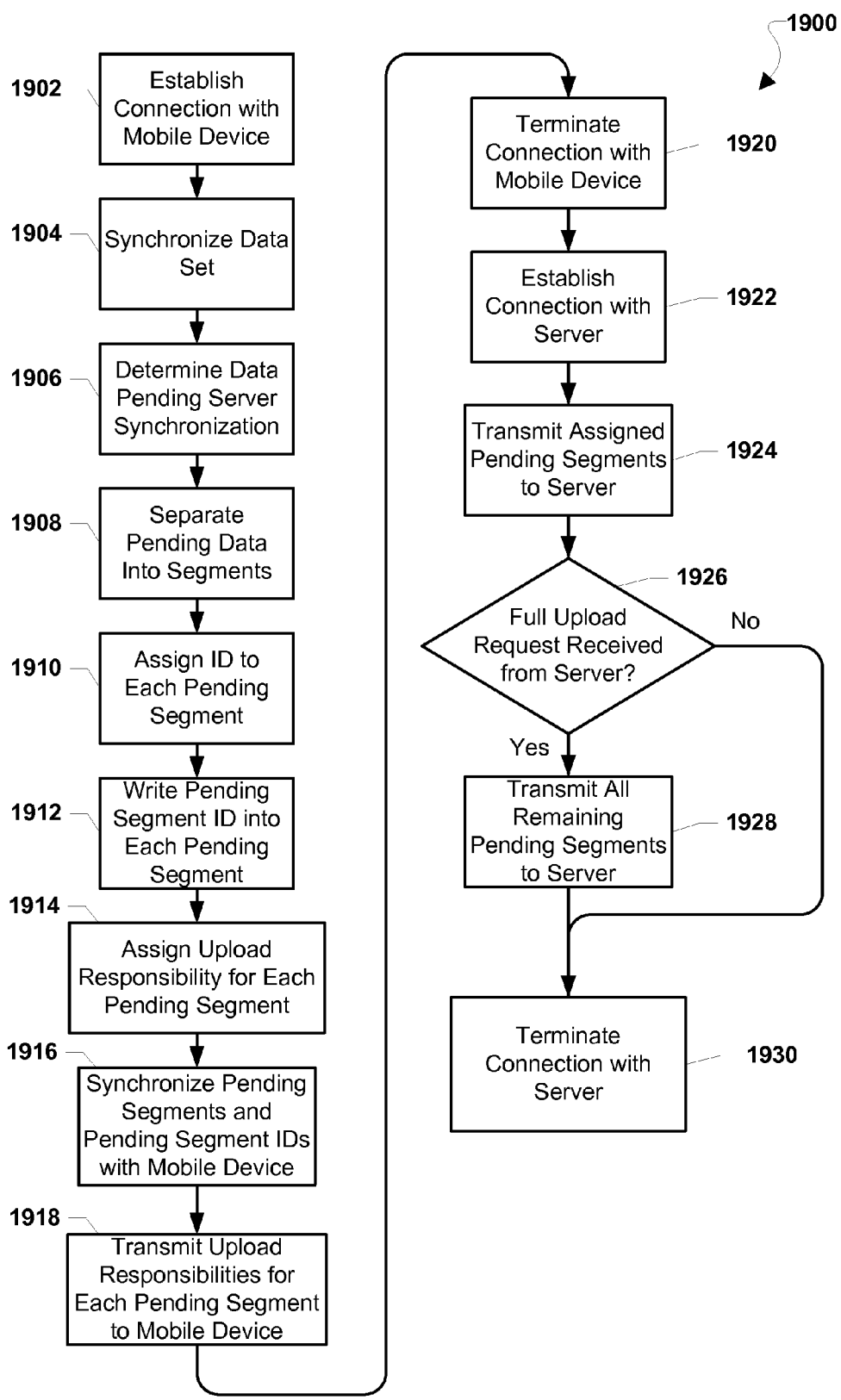
FIG. 19 is a process flow diagram illustrating an embodiment method for assigning and transmitting data pending synchronization among computing devices.

FIG. 19 illustrates an embodiment method 1900 for assigning and transmitting data pending synchronization among computing devices. As an example, the method 1900 may be implemented between a first mobile computing device, such as laptop computer 106, a second mobile computing device, such as a smart phone 104, and a server 102. While discussed in relation to a laptop computer 106, smart phone 104, and server 102, the method 1900 may be implemented among an unlimited number of devices. At block 1902 a first mobile computing device, such as the laptop computer 106, may establish a communication data link connection with a second mobile computing device, such as the smart phone 104. The communication data link connection may be any type of connection, as discussed above with reference to FIG. 1. At block 1904 the first mobile computing device may synchronize a data set between the first mobile computing device and the second mobile computing device. Synchronization of the data set may be accomplished by any method, such as by implementing any of the methods discussed above with reference to FIGS. 15, 16, 17, and 18. Synchronization of the data set between the first mobile computing device and the second mobile computing device may result in an identical data set being resident on both the first mobile computing device and the second mobile computing device.

At block 1906 the first mobile computing device may determine whether any data in the now synchronized data set is pending server synchronization. Data pending server synchronization may be data which has been altered in some way since the last data synchronization between the first mobile computing device and the server 102. The first mobile computing device may determine data is pending server synchronization by reading file header information, recognizing a tag associated with the data, referencing a data segment map, or by receiving a user input indicating the data is pending server synchronization.

At block 1908 the first mobile computing device may separate the data pending server synchronization into segments. A segment may include any grouping of the data pending server synchronization, and the separation of the data may be performed based on data characteristics, or the data pending server synchronization may be separated according to predetermined parameters, such as a set segment size. At block 1910 the first mobile computing device may assign an identification ("ID") to each pending segment. This pending segment ID may be a unique number, name, or identification element generated by the first mobile computing device. Additionally, a pending segment ID may contain or provide information about the segment, such as information regarding the segment contents, the time of creation of the segment, the first mobile computing device, the second mobile computing device, and intended server, or the segment size. At block 1912 the first mobile computing device may write the pending segment ID into each pending segment. The pending segment ID may be written into data representing the entire segment, or may be written into each data element comprising the individual pending segment.

At block 1914 the first mobile computing device may assign an upload responsibility for each pending segment. An upload responsibility may be an assignment for a specific mobile computing device to transmit a specific pending segment to a server. As an example, the laptop computer 106 may assign half the pending segments to the smart phone 104 for upload, and may assign the other half the pending segments to itself for upload. Assignment considerations are discussed further below. At block 1916 first mobile computing device may synchronize the pending segments and pending segment IDs with the second mobile computing device. Synchronization of the pending segments and pending segment IDs may result in the first and second mobile computing devices having similar data sets with similar pending segments and similar pending segment IDs. As an example, synchronization of the pending segments and pending segment IDs may be accomplished by the first mobile computing device transmitting the pending segments and pending segment IDs to the second mobile computing device. The first mobile computing device may transmit all of the pending segments and pending segment IDs to the second mobile computing device, or alternatively may transmit only the portion of the pending segments and pending segment IDs assigned to the second mobile computing device. In an alternative example, the first mobile computing device may transmit instructions to the second mobile computing device for the second mobile computing device to use in creating identical pending segments and pending segment IDs. The instructions may include information such as the data included in each pending segment, a starting point for the data pending server synchronization and standard pending segment size, a pending segment ID numbering scheme, or other information enabling the second mobile computing device to recreate the pending data segments and pending segment IDs.

At block 1918 the first mobile computing device may transmit the upload responsibilities for each pending segment to the second mobile computing device. At block 1920 the first mobile computing device may terminate its communication data link connection with the second mobile computing device. At block 1922, the first mobile computing device may establish a communication data link connection with the server 102. The connection may be any type of connection, as discussed above with reference to FIG. 1. At block 1924, the first mobile computing device may transmit its assigned pending segments to the server 102. At determination block 1926, the first mobile computing device may determine if a full upload request is received from the server 102. A full upload request may be a message received from the server 102 indicating that the server 102 requests a full upload of all data pending synchronization. As an example, a full upload request may be sent by the server 102 in response to an indication that the second mobile computing device, such as the smart phone 104, has been lost, damaged, or destroyed. If a full upload request is not received (i.e., determination block 1926="No"), at block 1930 the first mobile device may terminate its communication data link connection with the server 102. If a full upload request is received (i.e., determination block 1926="Yes"), at block 1926 the first mobile computing device may transmit all the remaining pending segments to the server 102. As an example, the first mobile device may transmit the pending segments assigned to the second mobile device. In this manner the server 102 may be updated with all pending segments by the first mobile computing device and all data which was pending server synchronization may be provided to the server 102 despite the loss, damage, or destruction of the second mobile device. At block 1930 the first mobile device may terminate its communication data link connection with the server 102.

Figure 20:
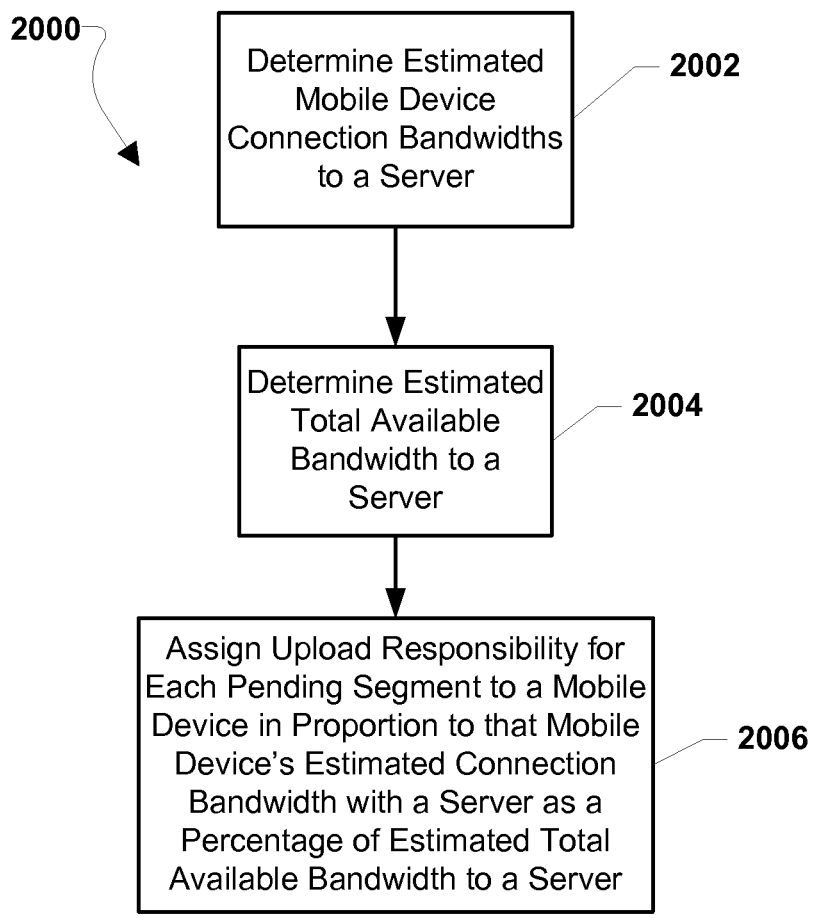
FIG. 20 is a process flow diagram illustrating a first embodiment method for assigning upload responsibility.

FIG. 20 illustrates an embodiment method 2000 for assigning upload responsibility which may be used in conjunction with method 1900 described above. In block 2002 the first mobile computing device may determine the estimated bandwidth available in both the first and second mobile computing device's data communication link connections to a server 102. As an example, the laptop computer 106 may determine the estimated connection bandwidth for its connection to the server 102 and the estimated connection bandwidth for a connection between the smart phone 104 and the server 102. The determination of the estimated connection bandwidths may be made by information received from each mobile computing device about its communication data link connection with the server 102 or stored bandwidth estimates for a device and/or connection type. At block 2004, first mobile computing device may determine the estimated total available bandwidth to a server 102 available using the first and second mobile computing devices by combining the estimated bandwidths for both mobile computing devices. At block 2006 the first mobile computing device may assign upload responsibility for each pending segment to a mobile computing device in proportion to that mobile computing device's estimated connection bandwidth with the server 102 as a percentage of total estimated total available bandwidth to the server 102. As an example the first mobile computing device may have a communication data link connection to the server 102 representing 70% of the total available bandwidth and the first mobile computing device may be assigned 70% of the data segments for transmission, while the second mobile computing device may have a communication data link connection to the server 102 representing 30% of the total available bandwidth and the second mobile computing device may be assigned 30% of the data segments for transmission. The first and second mobile computing devices may then complete the uploading of data to the server 102 per method 1900 as described above.

Figure 21:
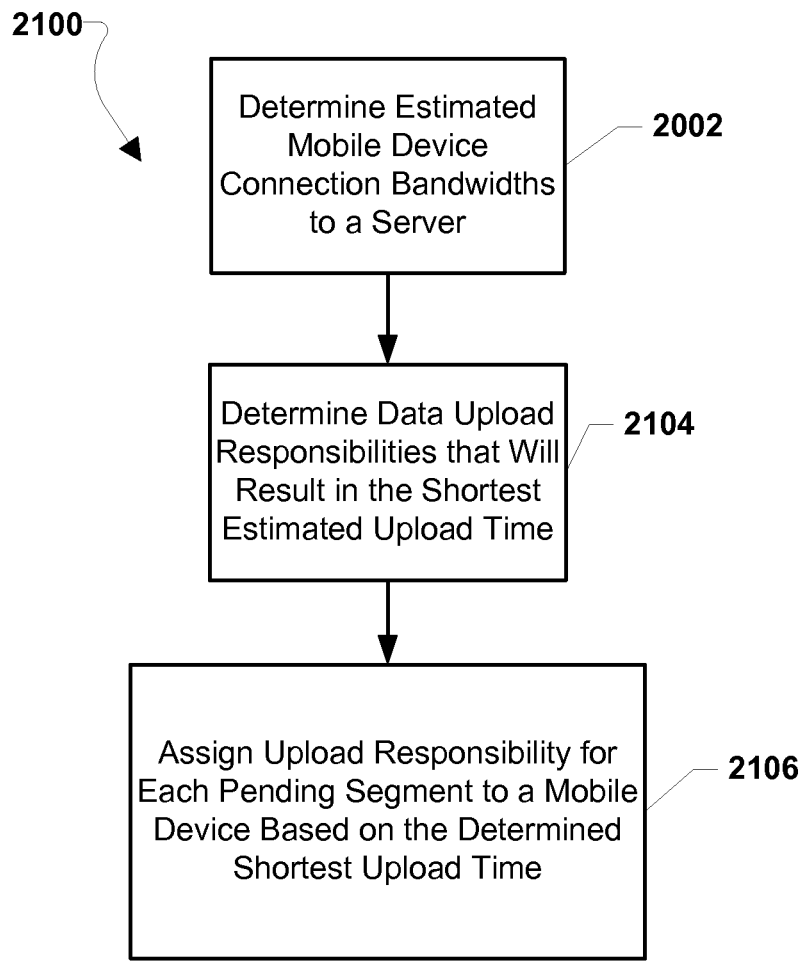
FIG. 21 is another process flow diagram illustrating a second embodiment method for assigning upload responsibility.

FIG. 21 illustrates an embodiment method 2100 for assigning upload responsibility which may be used in conjunction with method 1900 described above. As discussed above, in block 2002 the first mobile computing device may determine the estimated bandwidth available in both the first and second mobile computing device's data communication link connections to a server 102. At block 2104 the first mobile computing device may determine data upload responsibilities that will result in the shortest estimated upload time. At block 2106 the first mobile computing device may assign upload responsibility for each segment to a mobile computing device based on the determined shortest download time. The first and second mobile computing devices may then complete the uploading of data to the server 102 per method 1900 as described above.

Figure 22:
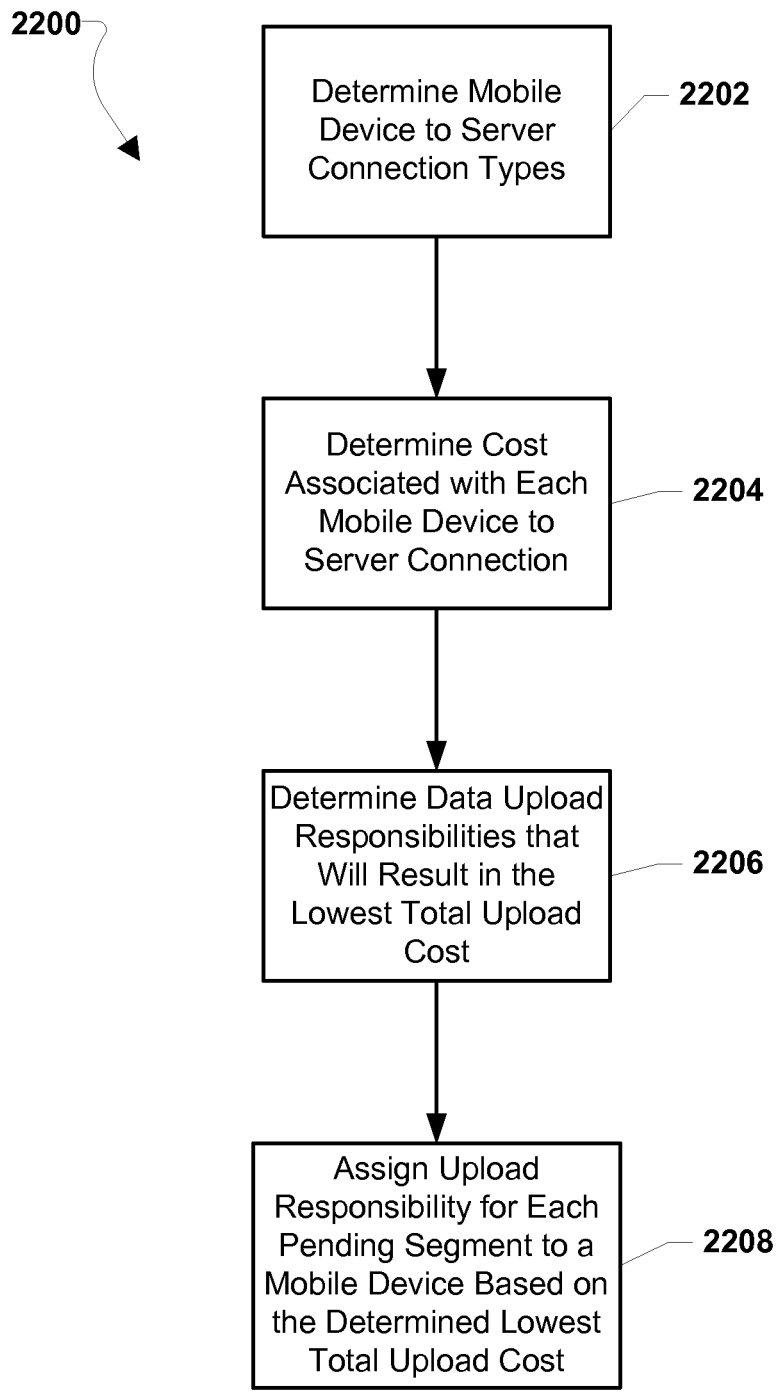
FIG. 22 is another process flow diagram illustrating a third embodiment method for assigning upload responsibility.

FIG. 22 illustrates an embodiment method 2200 for assigning upload responsibility which may be used in conjunction with method 1900 described above. At block 2202 the first mobile computing device may determine the mobile computing device to server 102 communication data link connection types. As an example, a communication data link connection between the server 102 and a smart phone 104 may be a 3G connection and a communication data link connection between the server 102 and a laptop computer 106 may be a Wi-Fi connection. At block 2204 the first mobile computing device may determine a data transmission cost associated with each mobile device to server 102 communication data link connection. As an example, the laptop computer 106 may be provided information that a 3G connection results in a fee being charged to a user for data transmitted over the connection and that no fee is charged for data transmitted over a Wi-Fi connection. At block 2206 the first mobile computing device may determine data upload responsibilities that will result in the lowest total upload cost. At block 2208 the first mobile computing device may assign upload responsibility for each pending segment to a mobile computing device based on the determined lowest total upload cost. In this manner, a first mobile computing device implementing method 2200 may operate in a cost saving mode. The first and second mobile computing devices may then complete the uploading of data to the server 102 per method 1900 as described above.

Figure 23:
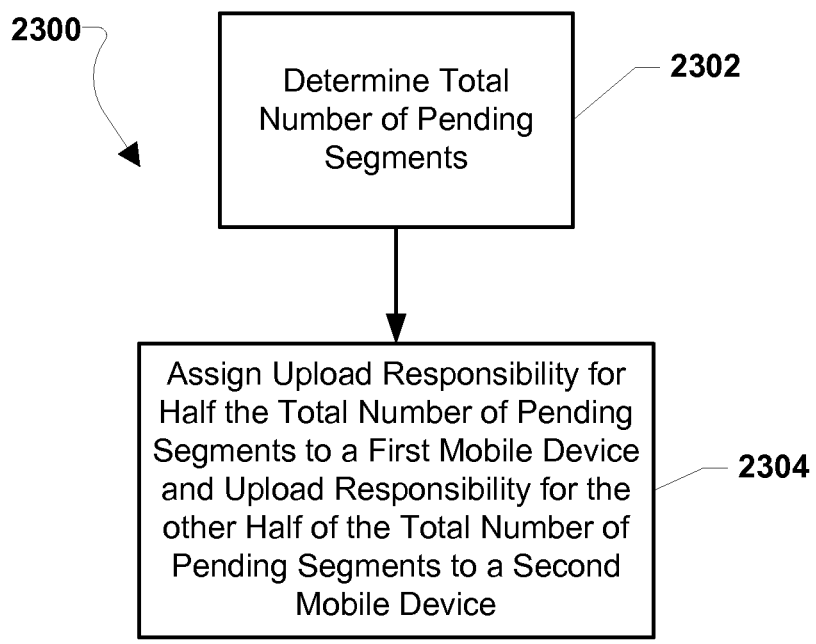
FIG. 23 is another process flow diagram illustrating a fourth embodiment method for assigning upload responsibility.

FIG. 23 illustrates an embodiment method 2300 for assigning upload responsibility which may be used in conjunction with method 1900 described above. At block 2302 the first mobile computing device may determine the total number of pending segments to be transmitted to the server 102. At block 2304 the first mobile computing device may assign upload responsibility for some fraction (e.g., half) the total number of pending segments to the first mobile computing device, such as the laptop computer 106, and upload responsibility for the other fraction of the total number of pending segments to the second mobile computing device, such as the smart phone 104. The first and second mobile computing devices may then complete the uploading of data to the server 102 per method 1900 as described above.

Figure 24:
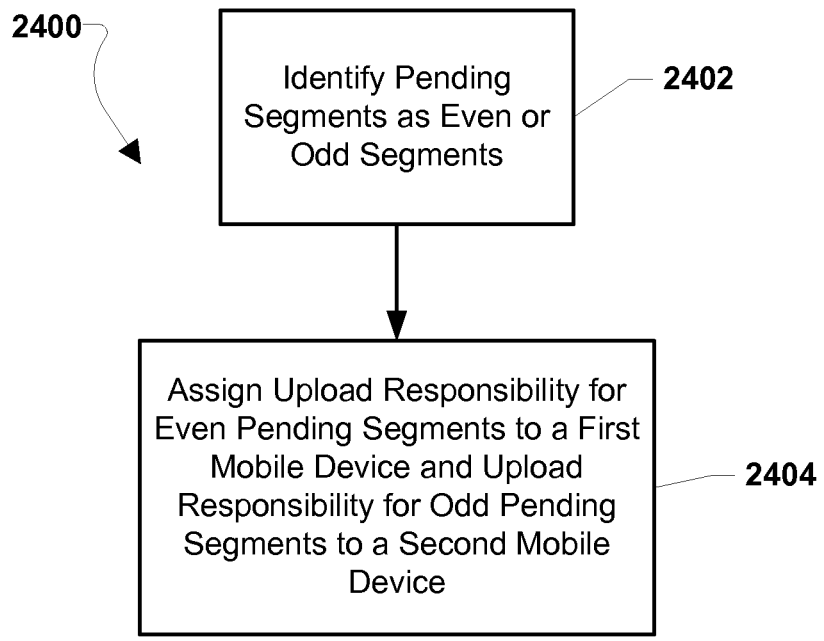
FIG. 24 is another process flow diagram illustrating a fifth embodiment method for assigning upload responsibility.

FIG. 24 illustrates an embodiment method 2400 for assigning upload responsibility which may be used in conjunction with method 1900 described above. At block 2402 the first mobile computing device may identify pending segments as even or odd segments. As an example the laptop computer 106 may write an even or odd identifying string into a data header for each segment. At block 2404 the first mobile computing device may assign upload responsibility for even pending segments to the first mobile device, such as the laptop computer 106, and upload responsibility for odd pending segments to the second mobile device, such as the smart phone 104. The first and second mobile computing devices may then complete the uploading of data to the server 102 per method 1900 as described above.

Figure 25:
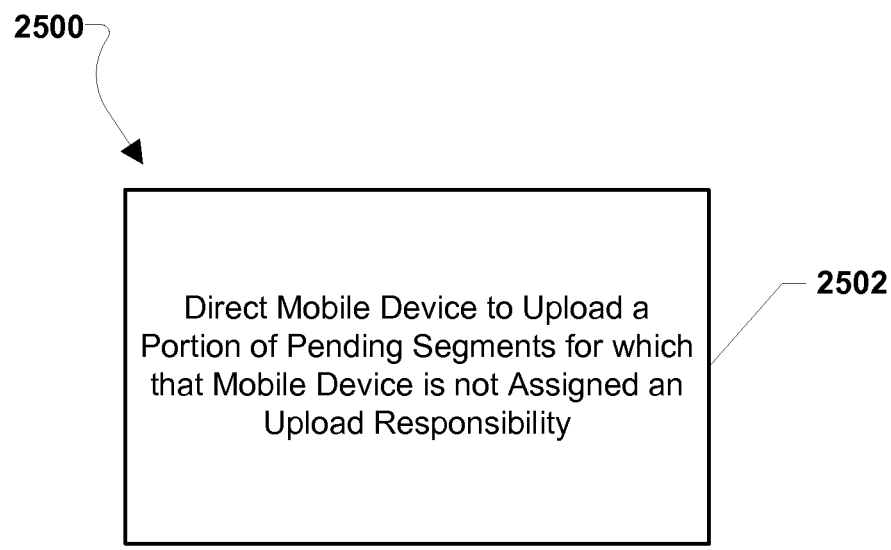
FIG. 25 is a process flow diagram illustrating an embodiment method for directing the transmission of data pending synchronization among computing devices.

FIG. 25 illustrates an embodiment method 2500 for directing the transmission of data pending synchronization among computing devices which may be used in conjunction with method 1900 described above. In block 2502 a server 102 may direct a first mobile computing device, such as a laptop computer 106, to upload a portion of the pending segments for which the first mobile computing device is not assigned an upload responsibility. As an example, a user input indicating that a second mobile device, such as the smart phone 104, which may have been assigned data segments to upload is lost, may trigger the server 102 to direct the first mobile computing device, such as laptop computer 106, to upload the portion of the pending segments originally assigned to the now lost smart phone 104. The direction from the server 102 to the first mobile computing device may be in the form of a full upload request sent to the first mobile computing device. In this manner, the loss or destruction of a mobile computing device may not result in the loss of data segments pending server synchronization. The first and second mobile computing devices may then complete the uploading of data to the server 102 per method 1900 as described above.

Figure 26:
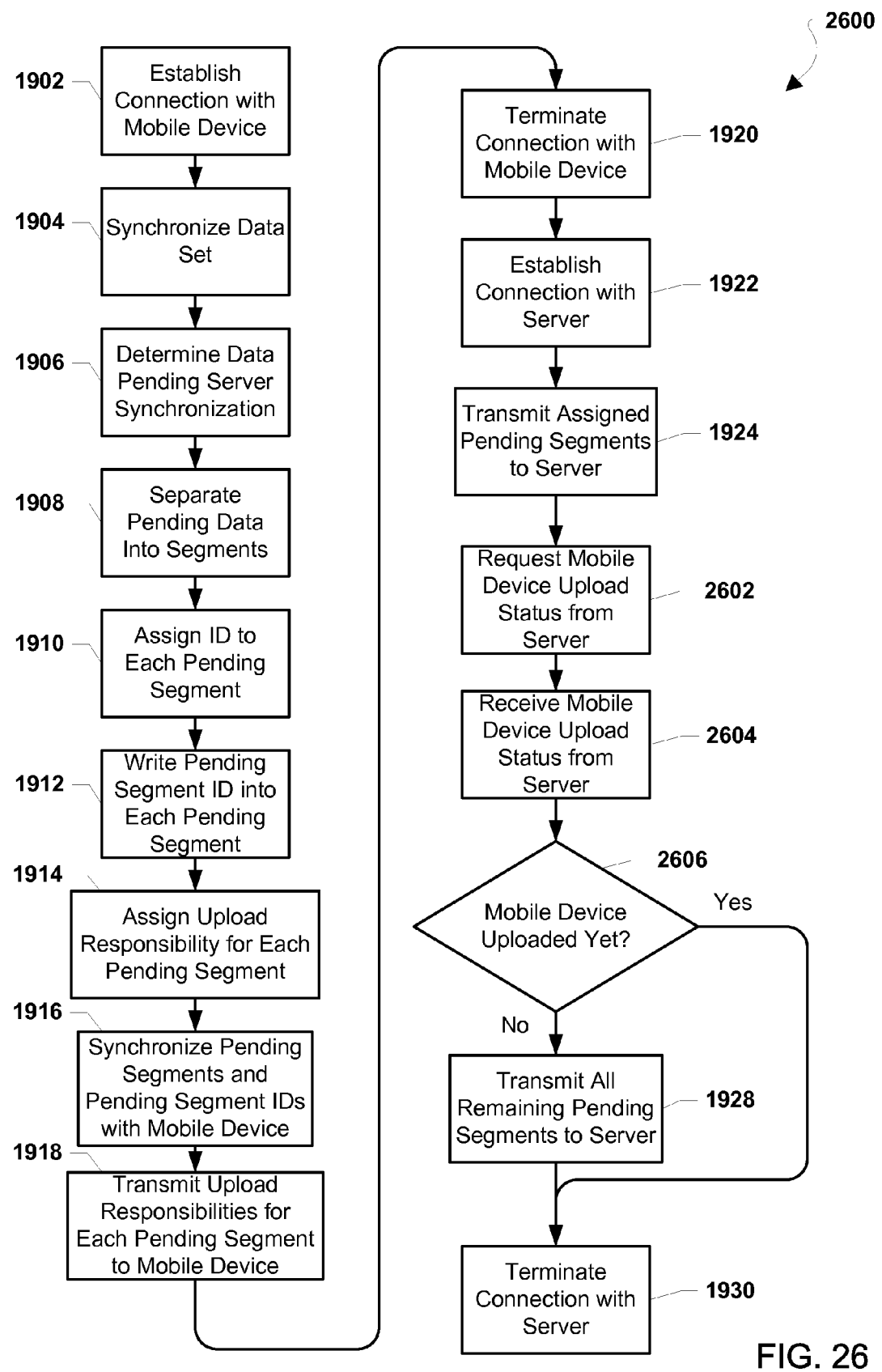
FIG. 26 is another process flow diagram illustrating another embodiment method for assigning and transmitting data pending synchronization among computing devices.

FIG. 26 illustrates an embodiment method 2600 for assigning and transmitting data pending synchronization among computing devices similar to method 1900, with the addition of an upload status determination. At block 2602, the first mobile computing device may request the second mobile computing device's upload status from the server 102. At block 2604 the first mobile computing device may receive second mobile computing device's upload status from the server 102. As an example, the laptop computer 106 may receive a message from the server 102 indicating the smart phone 104, has not uploaded. At determination block 2606, the first mobile computing device may use the information received in block 2604 to determine if the second mobile computing device has uploaded. If the second mobile computing device has not uploaded (i.e., determination block 2606="No"), the first mobile computing device may transmit all remaining pending segments to the server 102 in block 1928. If the second mobile computing device has upload (i.e., determination block 2606="Yes"), at block 1930 the first mobile computing device may terminate its communication data link connection with the server 102.

Figure 27:
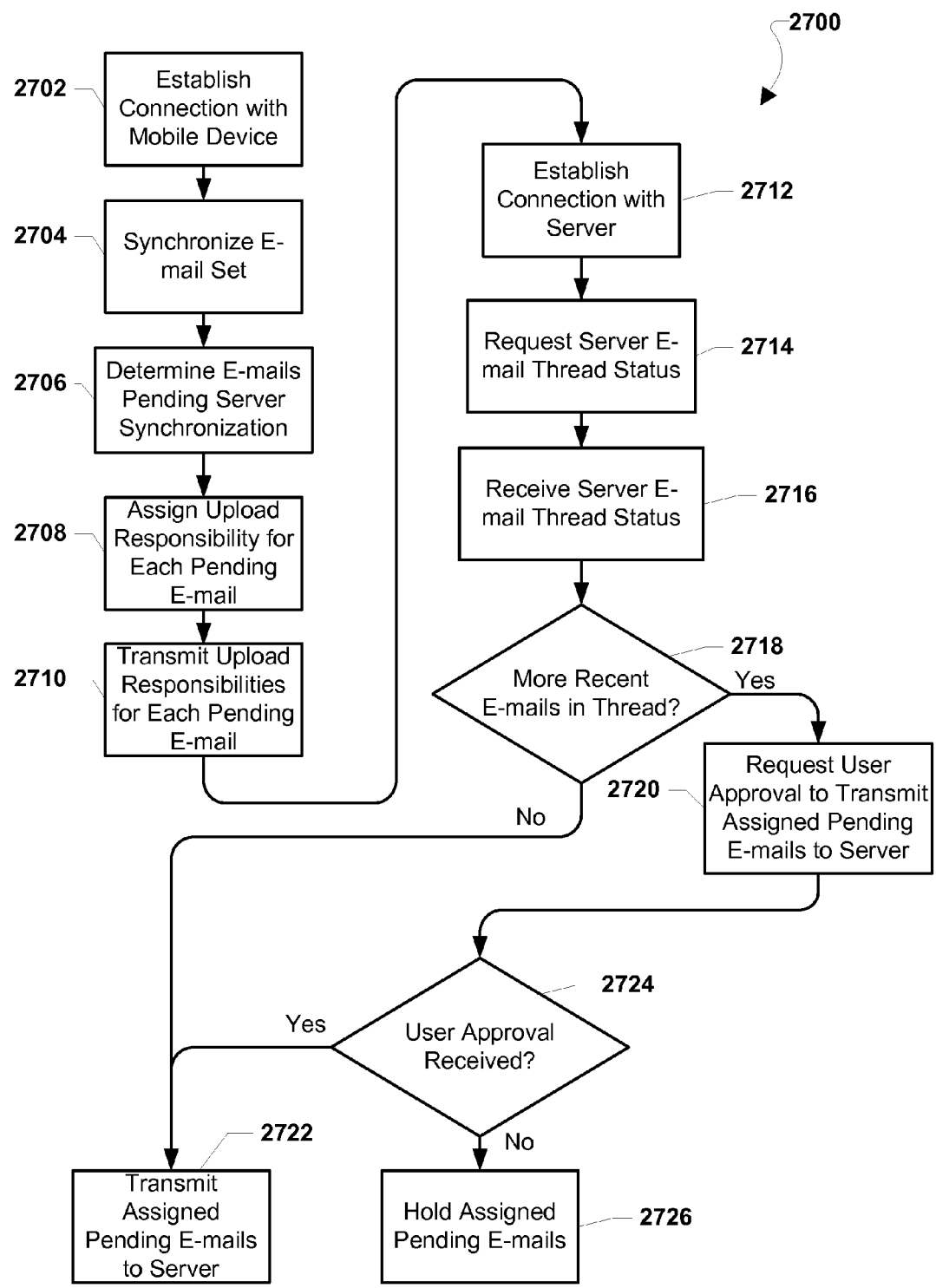
FIG. 27 is a process flow diagram illustrating an embodiment method for optimizing e-mail delivery.

FIG. 27 illustrates an embodiment method 2700 for optimizing delivery of e-mails. Embodiment method 2700 may be implemented on a first mobile computing device, such as a laptop computer 106, which may synchronize a data set with a second mobile computing device, such as a smart phone 104, and which may provide an assigned portion of the data set to a server 102. While discussed in relation to three devices, method 2700 may be implemented among more than three devices. In block 2702 the first mobile computing device may establish a communication data link connection with the second mobile computing device. The communication data link connection may be any type of connection, as discussed above with reference to FIG. 1. At block 2704 the first mobile computing device may synchronize an e-mail set between the first mobile computing device and the second mobile computing device. The e-mail set may be synchronized by any method, for example those discussed above with reference to FIGS. 15, 16, 17, and 18. At block 2706 the first mobile computing device may determine e-mails pending for synchronization with the server 102.

At block 2708 the first mobile computing device may assign an upload responsibility for each pending segment. An upload responsibility may be an assignment for a specific mobile computing device to transmit a specific pending e-mail to the server 102. In this manner each pending e-mail may be assigned to a different mobile computing device for upload. As an example, the laptop computer 106 may assign half the e-mails to the smart phone 104 for upload, and the other half of the e-mails to itself for upload. At block 2710 the first mobile computing device may transmit the upload responsibilities for each pending e-mail to the second mobile computing device. At block 2712, the first mobile computing device may establish a communication data link connection with the server 102. The communication data link connection may be any type of connection, as discussed above with reference to FIG. 1.

At block 2714 the first mobile computing device may request the server 102 provide the first mobile computing device with an e-mail thread status. An e-mail thread status may an indication of the time of receipt of the most recent e-mail in an e-mail thread or a listing of all e-mails in an e-mail thread resident on the server 102. At block 2716 the first mobile computing device may receive a message from the server 102 providing the e-mail thread status. In this manner the first mobile computing device may be updated with the current status of each e-mail thread. At determination block 2718 the first mobile computing device may determine if more recent e-mails are in a thread using information in the e-mail thread status received in block 2716. As an example, the laptop computer 106 may have been disconnected from the server 102 for a period of time. During that disconnected period a laptop computer 106 user may have drafted e-mails in response to e-mails received before the laptop computer 106 was disconnected from the server 102. While the laptop computer 106 was disconnected, other recipients may have exchanged e-mails so the e-mail thread may have e-mails more recent than those stored on the laptop computer 106. If the first mobile computing device determines there are more recent e-mails in a thread (i.e., determination block 2718="Yes"), in block 2720 the first mobile computing device may request user approval to transmit its assigned pending e-mails. As an example, user approval may be requested via a pop-up window or other type user prompt displayed by first mobile computing device. If the first mobile computing device determines there are no more recent e-mails in the thread (i.e., determination block 2718="No"), at block 2722 the first mobile computing device may transmit its assigned pending e-mails to the server 102.

At determination block 2724 the first mobile computing device may determine if the user approved transmitting its assigned pending e-mails to the server. User approval may be received as a user input, such as a button push or display selection indication. If user approval is received (i.e., determination block 2724="Yes"), at block 2722 the first mobile computing device may transmit its assigned pending e-mails to the server 102. If user approval is not received (i.e., determination block 2724="No"), at block 2726 the first mobile computing device may hold its assigned pending e-mails. In this manner, e-mails which are outdated compared to the progress of the e-mails in the thread may be held and a user may avoid causing confusion in an e-mail thread by responding to outdated e-mails.

Figure 28A:
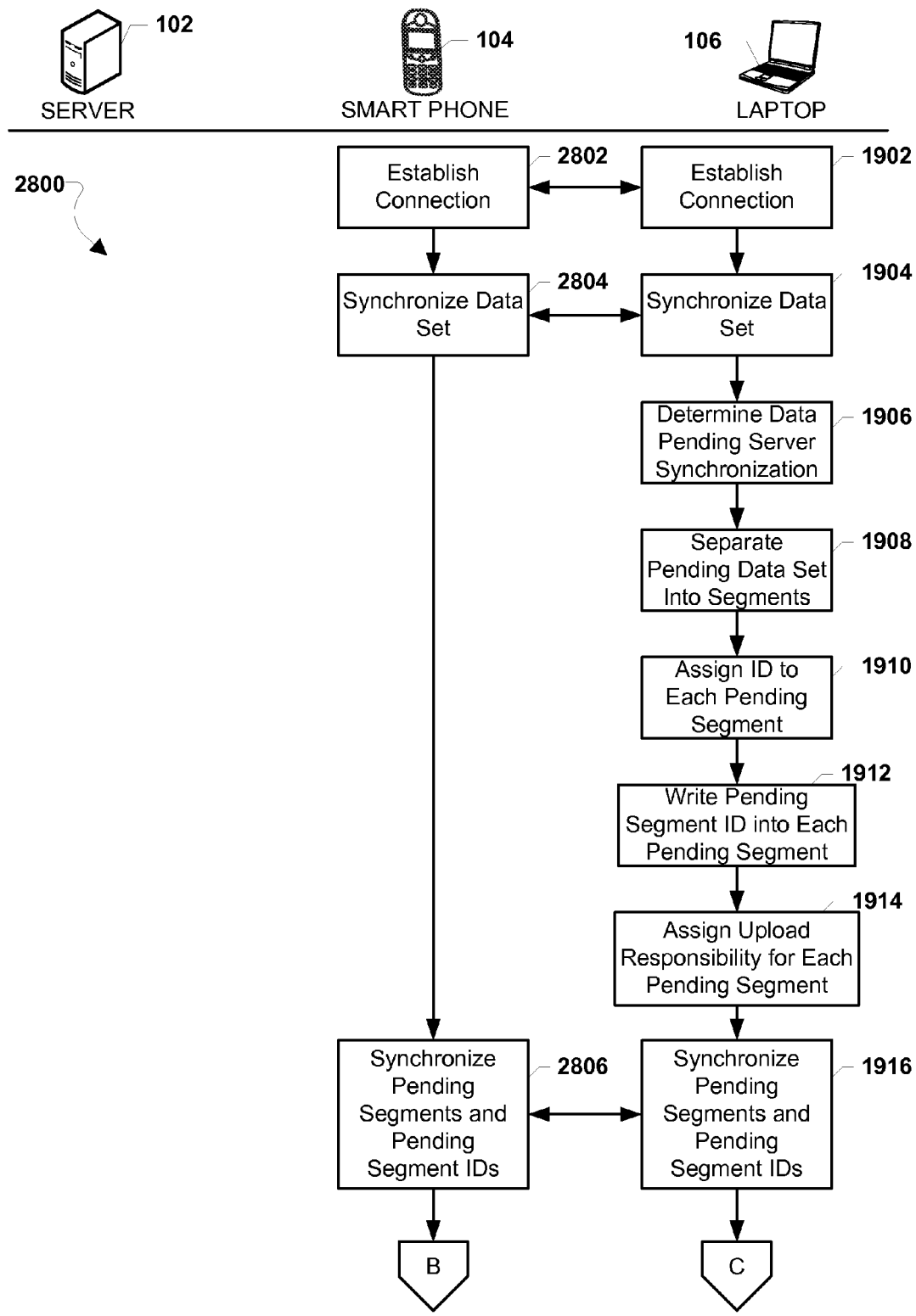
FIGS. 28A and 28B are additional process flow diagrams illustrating another embodiment method for managing interactions between computing devices to optimize data delivery.
Figure 28B:
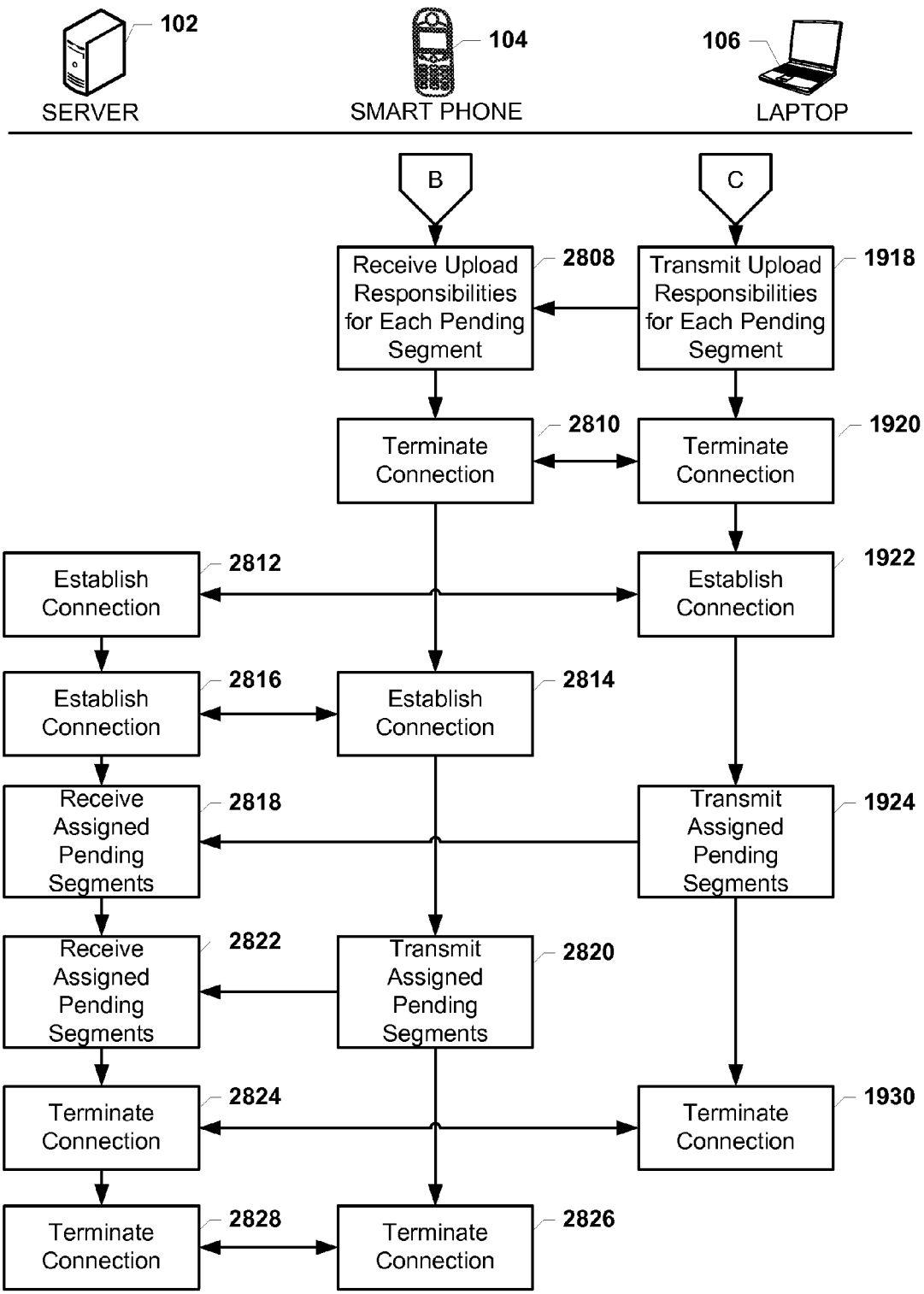

FIGS. 28A and 28B illustrate another embodiment method 2800 for managing interactions between a server 102, a smart phone 104, and a laptop computer 106 to optimize data delivery. At blocks 1902, 1904, 1906, 1908, 1910, 1912, 1914, 1916, 1918, 1920, 1922, 1924, and 1930 the laptop computer 106 may perform operations of method 1900 described above with reference to FIG. 19. At block 2802 and 1902 the smart phone 104 and laptop computer 106 may establish a communication data link connection. The communication data link connection may be any connection suitable for transmitting data, such as those connections previously discussed previously in relation to FIG. 1. At blocks 2804 and 1904 the smart phone 104 and laptop computer 106 may synchronize a data set between themselves as accomplished in method 1900. At blocks 2806 and 1916 the smart phone 104 and laptop computer 106 may synchronized the pending segments and pending segment IDs as accomplished in method 1900.

At block 2808 the smart phone 104 may receive the upload responsibilities for each pending segment from the laptop 106. In this transmission the smart phone 104 may receive an indication of both its own upload responsibilities and that of the laptop computer 106. At blocks 2810 and 1920 the smart phone 104 and laptop computer 106 may terminate their communication data link connections with each other.

At blocks 1922 and 2812 the laptop computer 106 and server 102 may establish a communication data link connection. The communication data link connection may be any connection suitable for transmitting data, such as those connections previously discussed previously in relation to FIG. 1. At blocks 2814 and 2186 the smart phone 104 and the server 102 may establish a communication data link connection. The communication data link connection may be any connection suitable for transmitting data, such as those connections previously discussed previously in relation to FIG. 1. At block 1924 the laptop computer 106 may transmit its assigned pending segments to the server 102. At block 2818 the server 102 may receive the transmitted pending segments assigned to the laptop computer 106. At block 2820 the smart phone 104 may transmit its assigned pending segments to the server 102. At block 2822 the server 102 may receive the transmitted pending segments assigned to the smart phone 104. In this manner, the full set of pending segments may be assembled in the server 102 and the full synchronized data set may be resident on the server 102, laptop 106, and smart phone 104. At blocks 1930 and 2824 the laptop computer 106 and server 102 may terminate their communication data link connections with each other. At blocks 2826 and 2828 the smart phone 104 and server 102 may terminate their communication data link connections with each other.

Figure 29:
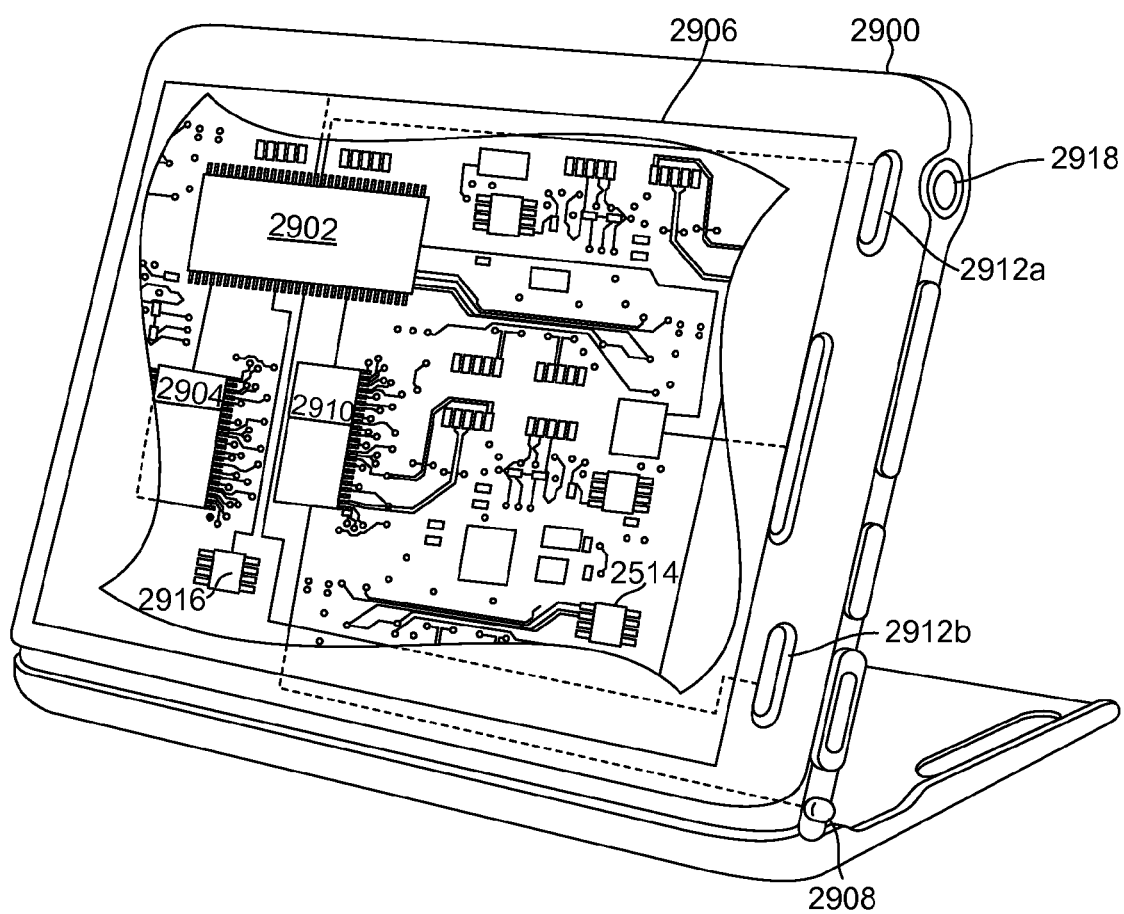
FIG. 29 is a component diagram of an example mobile computing device suitable for use with the various embodiments.

The various embodiments may be implemented in any of a variety of mobile devices, an example of which is illustrated in FIG. 29. For example, the mobile device 2900 may include a processor 2902 coupled to internal memories 2904 and 2910. Internal memories 2904 and 2910 may be volatile or non-volatile memories, and may also be secure and/or encrypted memories, or unsecure and/or unencrypted memories, or any combination thereof. The processor 2902 may also be coupled to a touch screen display 2906, such as a resistive-sensing touch screen, capacitive-sensing touch screen infrared sensing touch screen, or the like. Additionally, the display of the mobile device 2900 need not have touch screen capability. Additionally, the mobile device 2900 may have one or more antenna 2908 for sending and receiving electromagnetic radiation that may be connected to a wireless data link and/or cellular telephone transceiver 2916 coupled to the processor 2902. The mobile device 2900 may also include physical buttons 2912*a* and 2912*b* for receiving user inputs. The mobile device 2900 may also include a power button 2918 for turning the mobile device 2900 on and off.

Figure 30:
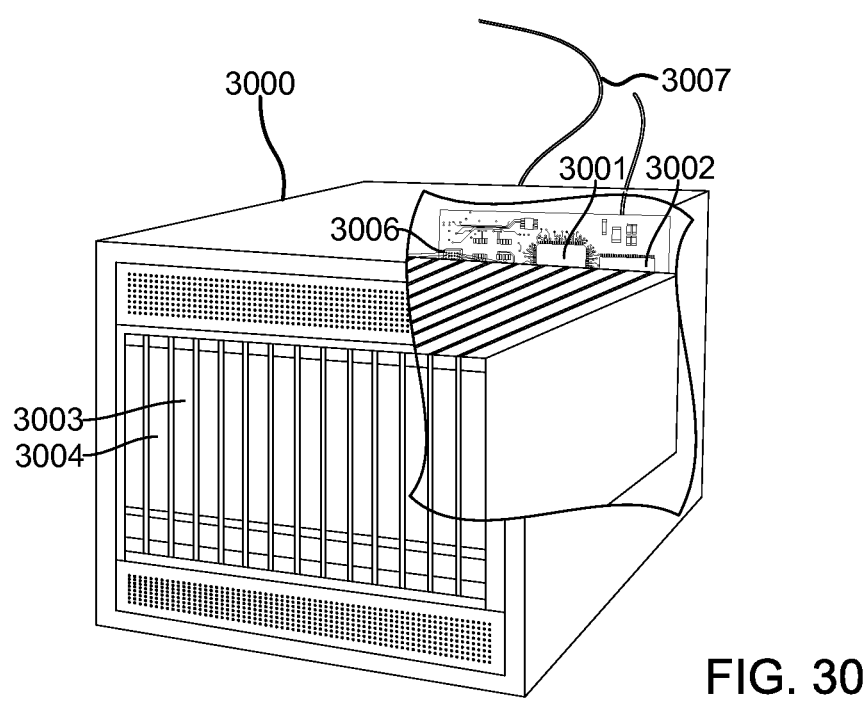
FIG. 30 is a component diagram of an example server suitable for use with the various embodiments.

The various embodiments may also be implemented on any of a variety of commercially available server devices, such as the server 3000 illustrated in FIG. 30. Such a server 3000 typically includes a processor 3001 coupled to volatile memory 3002 and a large capacity nonvolatile memory, such as a disk drive 3003. The server 3000 may also include a floppy disc drive, compact disc (CD) or DVD disc drive 3004 coupled to the processor 3001. The server 3000 may also include network access ports 3006 coupled to the processor 3001 for establishing network interface connections with a network 3007, such as a local area network coupled to other broadcast system computers and servers.

Figure 31:
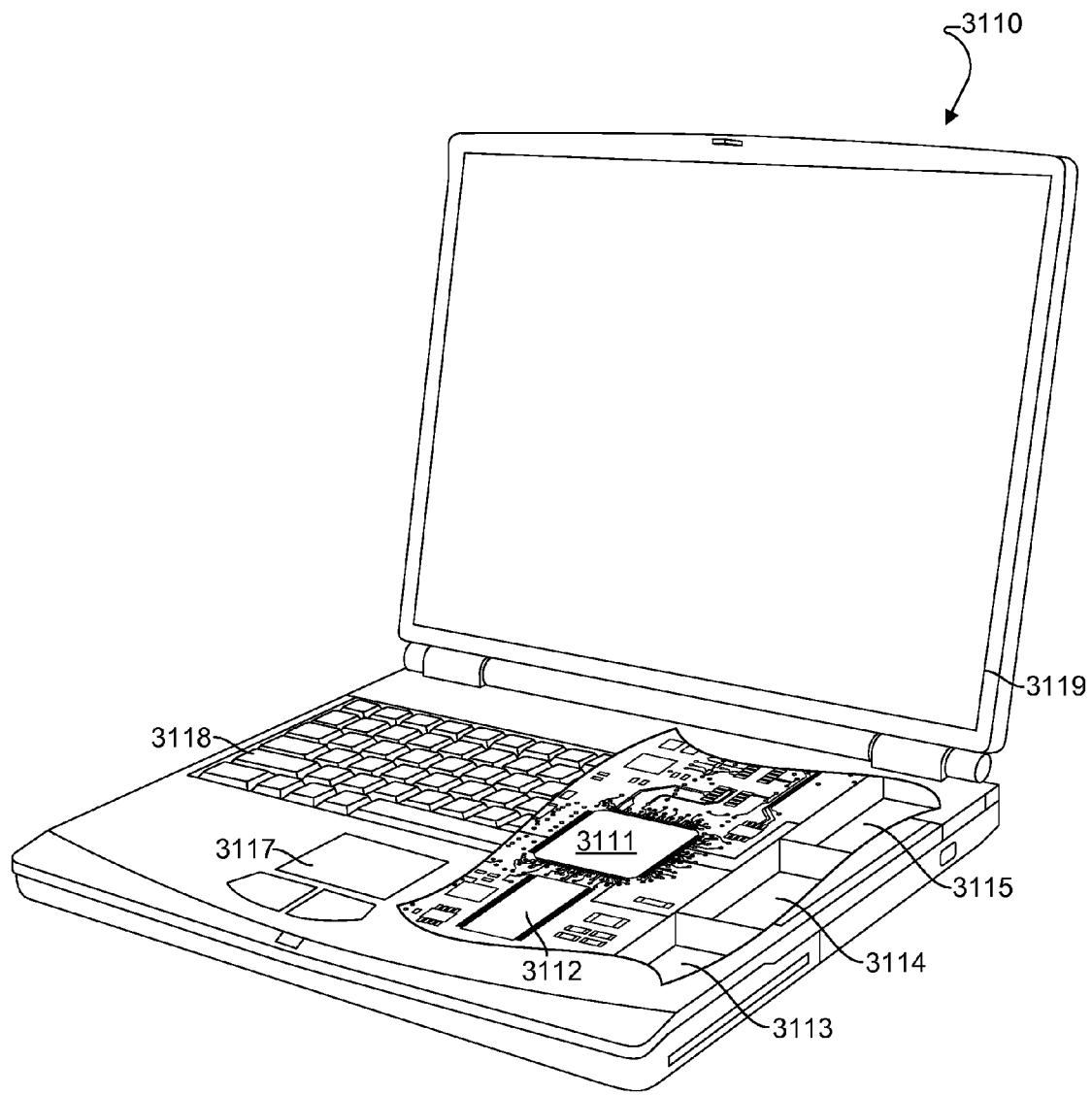
FIG. 31 is a component diagram of another example mobile computing device suitable for use with the various embodiments.

The various embodiments described above may also be implemented within a variety of personal computing devices, such as a laptop computer 3110 as illustrated in FIG. 31. Many laptop computers include a touch pad touch surface 3117 that serves as the computer's pointing device, and thus may receive drag, scroll, and flick gestures similar to those implemented on mobile computing devices equipped with a touch screen display and described above. A laptop computer 3110 will typically include a processor 3111 coupled to volatile memory 3112 and a large capacity nonvolatile memory, such as a disk drive 3113 of Flash memory. The computer 3110 may also include a floppy disc drive 3114 and a compact disc (CD) drive 3115 coupled to the processor 3111. The computer device 3110 may also include a number of connector ports coupled to the processor 3111 for establishing data connections or receiving external memory devices, such as a USB or FireWire® connector sockets, or other network connection circuits for coupling the processor 3111 to a network. In a notebook configuration, the computer housing includes the touchpad 3117, the keyboard 3118, and the display 3119 all coupled to the processor 3111. Other configurations of the computing device may include a computer mouse or trackball coupled to the processor (e.g., via a USB input) as are well known, which may also be use in conjunction with the various embodiments.

The processors 2902, 3001, and 3111 may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory 2904, 2910, 3002, 3003, 3112, and 3113 before they are accessed and loaded into the processor 2902, 3001, and 3111. The processor 2902, 3001, and 3111 may include internal memory sufficient to store the application software instructions. In many devices the internal memory may be a volatile or nonvolatile memory, such as flash memory, or a mixture of both. For the purposes of this description, a general reference to memory refers to memory accessible by the processor 2902, 3001, and 3111 including internal memory or removable memory plugged into the device and memory within the processor 2902, 3001, and 3111 itself.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored on or transmitted over as one or more instructions or code on a computer-readable medium. The steps of a method or algorithm disclosed herein may be embodied in a processor-executable software module which may reside on a tangible, non-transitory computer-readable storage medium. Tangible, non-transitory computer-readable storage media may be any available media that may be accessed by a computer. By way of example, and not limitation, such non-transitory computer-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a tangible, non-transitory machine readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for optimizing data delivery among devices, comprising:
    identifying in a first computing device a data set for transmission from the first computing device to a plurality of computing devices connected to the first computing device;
    separating the data set into data segments;
    determining a geographic location of the plurality of computing devices;
    determining by the first computing device that the plurality of computing devices are within a threshold distance from each other based on the determined geographic locations;
    assigning by the first computing device a portion of the data segments to each of the plurality of computing devices in response to determining that the plurality of computing devices are within the threshold distance from each other;
    transmitting from the first computing device to each of the plurality of computing devices that computing device's assigned portion of the data segments;
    connecting a second computing device of the plurality of computing devices to a third computing device of the plurality of computing devices; and exchanging between the second and third computing devices their respective assigned portions of the data segments.

2. The method of claim 1, further comprising:
assigning an identification (ID) to each data segment;
generating a data segment map; and
transmitting the data segment map to each of the plurality of computing devices,
wherein the data segment map comprises each data segment's ID and data segment assignment information.

3. The method of claim 1, further comprising:
determining a data set characteristic,
wherein separating the data set into data segments comprises separating the data set into data segments based, at least in part, on the determined data set characteristic.

4. The method of claim 1, further comprising:
determining a connection bandwidth for each connection between the first computing device and the plurality of computing devices; and
determining a total available bandwidth based on a sum of all the connection bandwidths between the first computing device and the plurality of computing devices,
wherein assigning a portion of the data segments to each of the plurality of computing devices comprises assigning data segments to each of the plurality of computing devices in proportion to each computing device's connection bandwidth as a percentage of the determined total available bandwidth.

5. The method of claim 1, further comprising:
determining a connection bandwidth for each connection between the first computing device and the plurality of computing devices; and
determining data segment assignments among the plurality of computing devices that will result in a shortest estimated download time,
wherein assigning a portion of the data segments to each of the plurality of computing devices comprises assigning data segments to each of the plurality of computing devices based on the determined shortest estimated download time.

6. The method of claim 1, further comprising:
determining a connection type for each connection between the first computing device and the plurality of computing devices;
determining a cost associated with each connection type; and
determining data segment assignments among the plurality of computing devices that will result in a lowest total download cost,
wherein assigning a portion of the data segments to each of the plurality of computing devices comprises assigning data segments to each of the plurality of computing devices based on the determined lowest total download cost.

7. The method of claim 1, further comprising:
determining when a connection between one of the plurality of computing devices and the first computing device is lost; and
transmitting the data set assigned to the computing device with which the connection was lost from the first computing device to a remaining one or more of the plurality of computing devices connected to the first computing device.

8. The method of claim 1, further comprising:
determining a device type for each of the plurality of computing devices; and
determining an amount of each data segment to send to each of the plurality of computing devices based on each computing device's determined device type,
wherein transmitting from the first computing device to each of the plurality of computing devices that computing device's assigned portion of the data segments comprises transmitting the determined amount of each data segment to send for that computing device.

9. The method of claim 1, further comprising determining a user preference setting, wherein assigning a portion of the data segments to each of the plurality of computing devices is based, at least in part, on the determined user preference setting.

10. The method of claim 1, wherein the plurality of computing devices are mobile devices and the first computing device is a central database server.

11. The method of claim 1, wherein the data set is comprised of e-mail.

12. The method of claim 1, further comprising:
determining an initial connection bandwidth for each connection between the first computing device and each of the plurality of computing devices;
determining a total initial available bandwidth based on a sum of all the initial connection bandwidths between the first computing device and each of the plurality of computing devices, wherein assigning a portion of the data segments to each of the plurality of computing devices comprises initially assigning data segments to each of the plurality of computing devices in proportion to each computing device's initial connection bandwidth as a percentage of the total initial available bandwidth;
monitoring a connection bandwidth for each connection between the first computing device and each of the plurality of computing devices;
determining if a change occurs in any connection bandwidth for each connection between the first computing device and each of the plurality of computing devices; and
if a change occurs in the connection bandwidth between the first computing device and any of the plurality of computing devices,
determining an updated connection bandwidth for each connection between the first computing device and each of the plurality of computing devices;
determining a total updated available bandwidth based on a sum of all the updated connection bandwidths between the first computing device and each of the plurality of computing devices;
reassigning data segments to each of the plurality of computing devices in proportion to each computing device's updated connection bandwidth as a percentage of the total updated available bandwidth; and
transmitting from the first computing device to each of the plurality of computing devices that computing device's reassigned portion of the data segments.

13. The method of claim 1, wherein exchanging between the second and third computing device their respective assigned portions of the data segments further comprises:
transmitting a data waiting message from the second computing device to the third computing device; and
transmitting a data segment map from the second computing device to the third computing device.

14. The method of claim 13, wherein exchanging between the second and third computing device their respective assigned portions of the data segments further comprises:
receiving the data segment map at the third computing device;

determining if any data segments are required by the third computing device based on a comparison of the data segment map and a data set resident on the third computing device; and transmitting a data segment request from the third computing device to the second computing device and transmitting a requested data segment from the second computing device to the third computing device when it is determined that data segments are required by the third computing device.

15. The method of claim 14, wherein exchanging between the second and third computing device their respective assigned portions of the data segments further comprises translating data in a requested data segment from a first application format to a second application format before transmitting the requested data segment from one computing device to the other computing device.

16. A system for optimizing data delivery, comprising:
a first computing device; and
a plurality of computing devices connected to the first computing device, the plurality of computing devices comprising at least a second computing device connected to a third computing device,
wherein the first computing device is configured with processor-executable instructions to perform operations comprising:
identifying a data set for transmission from the first computing device to the plurality of computing devices connected to the first computing device;
separating the data set into data segments;
determining a geographic location of each of the plurality of computing devices;
determining that the plurality of computing devices are within a threshold distance from each other based on the determined geographic locations;
assigning a portion of the data segments to each of the plurality of computing devices in response to determining that the plurality of computing devices are within the threshold distance from each other; and
transmitting to each of the plurality of computing devices that computing device's assigned portion of the data segments,
wherein the plurality of computing devices are configured with processor-executable instructions to perform operations comprising exchanging between each other their respective assigned portions of the data segments.

17. The system of claim 16, wherein the first computing device is configured with processor-executable instructions to perform operations further comprising:
assigning an identification (ID) to each data segment;
generating a data segment map; and
transmitting the data segment map to each of the plurality of computing devices,
wherein the data segment map comprises each data segment's ID and data segment assignment information.

18. The system of claim 16, wherein the first computing device is configured with processor-executable instructions to perform operations further comprising:
determining a data set characteristic,
wherein separating the data set into data segments comprises separating the data set into data segments based, at least in part, on the determined data set characteristic.

19. The system of claim 16, wherein the first computing device is configured with processor-executable instructions to perform operations further comprising:

determining a connection bandwidth for each connection between the first computing device and each of the plurality of computing devices; and
determining a total available bandwidth based on a sum of all the connection bandwidths between the first computing device and the plurality of computing devices,
wherein assigning a portion of the data segments to each of the plurality of computing devices comprises assigning data segments to each of the plurality of computing devices in proportion to each computing device's connection bandwidth as a percentage of the determined total available bandwidth.

20. The system of claim 16, wherein the first computing device is configured with processor-executable instructions to perform operations further comprising:
determining a connection bandwidth for each connection between the first computing device and each of the plurality of computing devices; and
determining data segment assignments among the plurality of computing devices that will result in a shortest estimated download time,
wherein assigning a portion of the data segments to each of the plurality of computing devices comprises assigning data segments to each of the plurality of computing devices based on the determined shortest estimated download time.

21. The system of claim 16, wherein the first computing device is configured with processor-executable instructions to perform operations further comprising:
determining a connection type for each connection between the first computing device and each of the plurality of computing devices;
determining a cost associated with each connection type; and
determining data segment assignments among the plurality of computing devices that will result in a lowest total download cost,
wherein assigning a portion of the data segments to each of the plurality of computing devices comprises assigning data segments to each of the plurality of computing devices based on the determined lowest total download cost.

22. The system of claim 16, wherein the first computing device is configured with processor-executable instructions to perform operations further comprising:
determining when a connection between one of the plurality of computing devices and the first computing device is lost; and
transmitting the data set assigned to the computing device with which the connection was lost from the first computing device to a remaining one or more of the plurality of computing devices connected to the first computing device.

23. The system of claim 16, wherein the first computing device is configured with processor-executable instructions to perform operations further comprising:
determining a device type for each of the plurality of computing devices; and
determining an amount of each data segment to send to each of the plurality of computing devices based on each computing device's determined device type,
wherein transmitting from the first computing device to each of the plurality of computing devices that computing device's assigned portion of the data segments comprises transmitting the determined amount of each data segment to send for that computing device.

24. The system of claim 16, wherein the first computing device is configured with processor-executable instructions to perform operations further comprising:
 determining a user preference setting,
  wherein assigning a portion of the data segments to each of the plurality of computing devices is based, at least in part, on the determined user preference setting.

25. The system of claim 16, wherein the plurality of computing devices are mobile devices and the first computing device is a central database server.

26. The system of claim 16, wherein the data set is comprised of e-mail.

27. The system of claim 16, wherein the first computing device is configured with processor-executable instructions to perform operations further comprising:
 determining an initial connection bandwidth for each connection between the first computing device and each of the plurality of computing devices;
 determining a total initial available bandwidth based on a sum of all the initial connection bandwidths between the first computing device and the plurality of computing devices, wherein assigning a portion of the data segments to each of the plurality of computing devices comprises initially assigning data segments to each of the plurality of computing devices in proportion to each computing device's initial connection bandwidth as a percentage of the total initial available bandwidth;
 monitoring a connection bandwidth for each connection between the first computing device and the plurality of computing devices;
 determining if a change occurs in connection bandwidth for each connection between the first computing device and any one or more of the plurality of computing devices; and
 if a change occurs in the connection bandwidth for each connection between the first computing device and any of the plurality of computing devices,
  determining an updated connection bandwidth for each connection between the first computing device and each of the plurality of computing devices;
  determining a total updated available bandwidth based on a sum of all the updated connection bandwidths between the first computing device and each of the plurality of computing devices;
  reassigning data segments to each of the plurality of computing devices in proportion to each computing device's updated connection bandwidth as a percentage of the total updated available bandwidth; and
  transmitting from the first computing device to each of the plurality of computing devices that computing device's reassigned portion of the data segments.

28. The system of claim 16, wherein each of the plurality of computing devices is configured with processor-executable instructions to perform operations further comprising:
 transmitting a data waiting message to each other of the plurality of computing devices; and
 transmitting a data segment map to the each other of the plurality of computing devices.

29. The system of claim 28, wherein the each of the plurality of devices is configured with processor-executable instructions to perform operations further comprising:
 receiving the data segment map from respective others of the plurality of computing devices;
 for each received data segment map determining if any data segments are required based on a comparison of the data segment map to data resident on the computing device;
 transmitting a data segment request to the respective other of the plurality of computing devices providing the data segment map when it is determined that a data segment is required,
 receiving a data segment request from another of the plurality of computing devices; and
 transmitting requested data segments to the another of the plurality of computing devices in response to the received data segment request.

30. The system of claim 29, wherein each of the plurality of computing devices is configured with processor-executable instructions to perform operations further comprising:
 translating data in a requested data segment from a first application format to a second application format before transmitting the requested data segment to another of the plurality of computing devices.

31. A system for optimizing data delivery, comprising:
 means for identifying in a first computing device a data set for transmission from the first computing device to a plurality of computing devices connected to the first computing device;
 means for separating the data set into data segments;
 means for determining a geographic location of each of the plurality of computing devices;
 means for determining in the first computing device that the plurality of computing devices are within a threshold distance from each other based on the determined geographic locations;
 means for assigning by the first computing device a portion of the data segments to each of the plurality of computing devices in response to determining that the plurality of computing devices are within the threshold distance from each other;
 means for transmitting from the first computing device to each of the plurality of computing devices that computing device's assigned portion of the data segments;
 means for exchanging between each of the plurality of computing devices their respective assigned portions of the data segments.

32. The system of claim 31, further comprising:
 means for assigning an identification (ID) to each data segment;
 means for generating a data segment map; and
 means for transmitting the data segment map to each of the plurality of computing devices,
 wherein the data segment map comprises each data segment's ID and data segment assignment information.

33. The system of claim 31, further comprising:
 means for determining a data set characteristic,
 wherein means for separating the data set into data segments comprises means for separating the data set into data segments based, at least in part, on the determined data set characteristic.

34. The system of claim 31, further comprising:
 means for determining a connection bandwidth for each connection between the first computing device and each of the plurality of computing devices; and
 means for the determining a total available bandwidth based on a sum of all the connection bandwidths between the first computing device and the plurality of computing devices,
 wherein means for assigning a portion of the data segments to each of the plurality of computing devices comprises means for assigning data segments to each of the plurality of computing devices in proportion to each computing device's connection bandwidth as a percentage of the determined total available bandwidth.

35. The system of claim 31, further comprising:
means for determining a connection bandwidth for each connection between the first computing device and each of the plurality of computing devices; and
means for determining data segment assignments among the plurality of computing devices that will result in a shortest estimated download time,
wherein means for assigning a portion of the data segments to each of the plurality of computing devices comprises means for assigning data segments to each of the plurality of computing devices based on the determined shortest estimated download time.

36. The system of claim 31, further comprising:
means for determining a connection type for each connection between the first computing device and each of the plurality of computing devices;
means for determining a cost associated with each connection type; and
means for determining data segment assignments among the plurality of computing devices that will result in a lowest total download cost,
wherein means for assigning a portion of the data segments to each of the plurality of computing devices comprises means for assigning data segments to each of the plurality of computing devices based on the determined lowest total download cost.

37. The system of claim 31, further comprising:
means for determining when a connection between one of the plurality of computing devices and the first computing device is lost; and
means for transmitting the data set assigned to the computing device with which the connection was lost from the first computing device to a remaining one or more of the plurality of computing devices connected to the first computing device.

38. The method of claim 31, further comprising:
means for determining a device type for each of the plurality of computing devices; and
means for determining an amount of each data segment to send to each of the plurality of computing devices based on each computing device's determined device type,
wherein means for transmitting from the first computing device to each of the plurality of computing devices that computing device's assigned portion of the data segments comprises means for transmitting the determined amount of each data segment to send for that computing device.

39. The system of claim 31, further comprising means for determining a user preference setting, wherein means for assigning a portion of the data segments to each of the plurality of computing devices comprises means for assigning a portion of the data segments to each of the plurality of computing devices based, at least in part, on the determined user preference setting.

40. The system of claim 31, wherein the plurality of computing devices are mobile devices and the first computing device is a central database server.

41. The system of claim 31, wherein the data set is comprising e-mail.

42. The system of claim 31, further comprising:
means for means for determining an initial connection bandwidth for each connection between the first computing device and each of the plurality of computing devices;
means for determining a total initial available bandwidth based on a sum of all the initial connection bandwidths between the first computing device and the plurality of computing devices, wherein assigning a portion of the data segments to each of the plurality of computing devices comprises initially assigning data segments to each of the plurality of computing devices in proportion to each computing device's initial connection bandwidth as a percentage of the total initial available bandwidth;
means for monitoring a connection bandwidth for each connection between the first computing device and the plurality of computing devices;
means for determining if a change occurs in connection bandwidth for each connection between the first computing device and any of the plurality of computing devices; and
if a change occurs in the connection bandwidth for each connection between the first computing device and any of the plurality of computing devices,
means for determining an updated connection bandwidth for each connection between the first computing device and each of the plurality of computing devices;
means for determining a total updated available bandwidth based on a sum of all the updated connection bandwidths between the first computing device and each of the plurality of computing devices;
means for reassigning data segments to each of the plurality of computing devices in proportion to each computing device's updated connection bandwidth as a percentage of the total updated available bandwidth; and
means for transmitting from the first computing device to each of the plurality of computing devices that computing device's reassigned portion of the data segments.

43. The system of claim 31, wherein means for exchanging between each of the plurality of computing devices their respective assigned portions of the data segments further comprises:
means for transmitting a data waiting message from each of the plurality of computing devices; and
means for transmitting a data segment map from each of the plurality of computing devices to the other of the plurality of computing devices.

44. The system of claim 43, wherein means for exchanging between each of the plurality of computing devices their respective assigned portions of the data segments further comprises:
means for receiving in each of the plurality of computing devices the data segment map from respective others of the plurality of computing devices;
means for determining in each of the plurality of computing devices if any data segments are required based on a comparison of the data segment map to data resident on the computing device;
means for transmitting a data segment request to the respective others of the plurality of computing devices providing the data segment map when it is determined that a data segment is required; and
means for transmitting requested data segments to a requesting computing device in response to receiving a data segment request.

45. The system of claim 44, means for exchanging between each of the plurality of computing devices their respective assigned portions of the data segments further comprises means for translating data in a requested data segment from a first application format to a second application format before transmitting the requested data segment to another of the plurality of computing devices.

46. A server, comprising:
a memory; and
a processor coupled to the memory, wherein the processor is configured with processor-executable instructions to perform operations comprising:
identifying in the server a data set for transmission from the server to a plurality of computing devices;
separating the data set into data segments;
determining a geographic location of each of the plurality of computing devices;
determining that the plurality of computing devices are within a threshold distance from each other based on the determined geographic locations;
assigning a portion of the data segments to each of the plurality of computing devices in response to determining that the plurality of computing devices are within the threshold distance from each other;
assigning an identification (ID) to each data segment;
generating a data segment map;
transmitting from the server to each of the plurality of computing devices that computing device's assigned portion of the data segments; and
transmitting the data segment map to each of the plurality of computing devices,
wherein the data segment map comprises each data segment's ID and data segment assignment information.

47. The server of claim 46, wherein the processor is configured with processor-executable instructions to perform operations further comprising:
determining a data set characteristic,
wherein separating the data set into data segments comprises separating the data set into data segments based, at least in part, on the determined data set characteristic.

48. The server of claim 46, wherein the processor is configured with processor-executable instructions to perform operations further comprising:
determining a connection bandwidth for each connection between the server and each of the plurality of computing devices; and
determining a total available bandwidth based on a sum of all the connection bandwidths between the server and the plurality of computing devices,
wherein assigning a portion of the data segments to each of the plurality of computing devices comprises assigning data segments to each of the plurality of computing devices in proportion to each computing device's connection bandwidth as a percentage of the determined total available bandwidth.

49. The server of claim 46, wherein the processor is configured with processor-executable instructions to perform operations further comprising:
determining a connection bandwidth for each connection between the server and each of the plurality of computing devices; and
determining data segment assignments among the plurality of computing devices that will result in a shortest estimated download time,
wherein assigning a portion of the data segments to each of the plurality of computing devices comprises assigning data segments to each of the plurality of computing devices based on the determined shortest estimated download time.

50. The server of claim 46, wherein the processor is configured with processor-executable instructions to perform operations further comprising:
determining a connection type for each connection between the server and each of the plurality of computing devices;
determining a cost associated with each connection type; and
determining data segment assignments among the plurality of computing devices that will result in a lowest total download cost,
wherein assigning a portion of the data segments to each of the plurality of computing devices comprises assigning data segments to each of the plurality computing devices based on the determined lowest total download cost.

51. The server of claim 46, wherein the processor is configured with processor-executable instructions to perform operations further comprising:
determining when a data connection between the server and one of the plurality of computing devices is lost; and
transmitting the data set assigned to the computing device with which the connection was lost from the server to a remaining one or more of the plurality of computing devices connected to the server.

52. The server of claim 46, wherein the processor is configured with processor-executable instructions to perform operations further comprising:
determining a device type for each of the plurality of computing devices; and
determining an amount of each data segment to send to each of the plurality of computing devices based on each computing device's determined device type,
wherein transmitting from the server to each of the plurality of computing devices that computing device's assigned portion of the data segments comprises transmitting the determined amount of each data segment to send for that computing device.

53. The server of claim 46, wherein the processor is configured with processor-executable instructions to perform operations further comprising:
determining a user preference setting, wherein assigning a portion of the data segments to each of the plurality of computing devices is based, at least in part, on the determined user preference setting.

54. The server of claim 46, wherein the data set comprises e-mail.

55. The server of claim 46, wherein the processor is configured with processor-executable instructions to perform operations further comprising:
determining an initial connection bandwidth for each connection between the server and each of the plurality of computing devices;
determining a total initial available bandwidth based on a sum of all the initial connection bandwidths between the server and the plurality of computing devices, wherein assigning a portion of the data segments to each of the plurality of computing devices comprises initially assigning data segments to each of the plurality of computing devices in proportion to each computing device's initial connection bandwidth as a percentage of the total initial available bandwidth;
monitoring a connection bandwidth for each connection between the server and the plurality of computing devices;
determining if a change occurs in connection bandwidth for each connection between the server and any of the plurality of computing devices; and
if a change occurs in the connection bandwidth for each connection between the server and the plurality of computing devices, determining an updated connection bandwidth for each connection between the server and the plurality of computing devices;

determining a total updated available bandwidth based on a sum of all the updated connection bandwidths between the server and each of the plurality of computing devices;

reassigning data segments to each of the plurality of computing devices in proportion to each computing device's updated connection bandwidth as a percentage of the total updated available bandwidth; and transmitting from the server to each of the plurality of computing devices that computing device's reassigned portion of the data segments.

56. A server for optimizing data delivery, comprising:

means for identifying in the server a data set for transmission from the server to a plurality of computing devices;

means for separating the data set into data segments;

means for determining a geographic location of each of the plurality of computing devices;

means for determining that the plurality of computing devices are within a threshold distance from each other based on the determined geographic locations;

means for assigning a portion of the data segments to each of the plurality of computing devices in response to determining that the plurality of computing devices are within the threshold distance from each other;

means for assigning an identification (ID) to each data segment;

means for generating a data segment map means for transmitting from the server to each of the plurality of computing devices that computing device's assigned portion of the data segments; and means for transmitting the data segment map to each of the plurality of computing devices, wherein the data segment map comprises each data segment's ID and data segment assignment information.

57. The server of claim 56, further comprising:

means for determining a data set characteristic, wherein means for separating the data set into data segments comprises means for separating the data set into data segments based, at least in part, on the determined data set characteristic.

58. The server of claim 56, further comprising:

means for determining a connection bandwidth for each connection between the server and each of the plurality of computing devices; and means for determining a total available bandwidth based on a sum of all the connection bandwidths between the server and the plurality of computing devices, wherein assigning a portion of the data segments to each of the plurality of devices comprises assigning data segments to each of the plurality of computing devices in proportion to each computing device's connection bandwidth as a percentage of the determined total available bandwidth.

59. The server of claim 56, further comprising:

means for determining a connection bandwidth for each connection between the server and each of the plurality of computing devices; and means for determining data segment assignments among the plurality of computing devices that will result in a shortest estimated download time, wherein means for assigning a portion of the data segments to each of the plurality of computing devices comprises means for assigning data segments to each of the plurality of computing devices based on the determined shortest estimated download time.

60. The server of claim 56, further comprising:

means for determining a connection type for each connection between the server and each of the plurality of computing devices;

means for determining a cost associated with each connection type; and means for determining data segment assignments among the plurality of computing devices that will result in a lowest total download cost, wherein means for assigning a portion of the data segments to each of the plurality of computing devices comprises means for assigning data segments to each of the plurality of computing devices based on the determined lowest total download cost.

61. The server of claim 56, further comprising:

means for determining when a data connection between the server and one of the plurality of computing devices is lost; and means for transmitting the data set assigned to the computing device with which the connection was lost from the server to a remaining one or more of the plurality of computing devices connected to the server.

62. The server of claim 56, further comprising:

means for determining a device type for each of the plurality of computing devices; and means for determining an amount of each data segment to send to each of the plurality of computing devices based on each computing device's determined device type, wherein means for transmitting from the server to each of the plurality of computing devices that computing device's assigned portion of the data segments comprises means for transmitting the determined amount of each data segment to send for that computing device.

63. The server of claim 56, further comprising means for determining a user preference setting, wherein means for assigning a portion of the data segments to each of the plurality of computing devices is based, at least in part, on the determined user preference setting.

64. The server of claim 56, wherein the data set comprises e-mail.

65. The server of claim 56, further comprising:

means for determining an initial connection bandwidth for each connection between the server and the plurality of computing devices;

means for determining a total initial available bandwidth based on a sum of all the initial connection bandwidths between the server and the plurality of computing devices, wherein means for assigning a portion of the data segments to each of the plurality of computing devices comprises means for initially assigning data segments to each of the plurality of computing devices in proportion to each computing device's initial connection bandwidth as a percentage of the total initial available bandwidth;

means for monitoring a connection bandwidth for each connection between the server and the plurality of computing devices;

means for determining if a change occurs in connection bandwidth for each connection between the server and any of the plurality of computing devices;

means for determining an updated connection bandwidth for each connection between the server and the plurality of computing devices if a change occurs in the connection bandwidth for each connection between the server and the plurality of computing devices;

means for determining a total updated available bandwidth based on a sum of all the updated connection bandwidths between the server and each of the plurality of computing devices;

means for reassigning data segments to each of the plurality of computing devices in proportion to each computing device's updated connection bandwidth as a percentage of the total updated available bandwidth; and means for transmitting from the server to each of the plurality of computing devices that computing device's reassigned portion of the data segments.

66. A non-transitory processor-readable medium having stored thereon processor-executable instructions configured to cause a server processor to perform operations comprising:

identifying in a server a data set for transmission from the server to a plurality of computing devices;

separating the data set into data segments;

determining a geographic location of each of the plurality of computing devices;

determining that the plurality of computing devices are within a threshold distance from each other based on the determined geographic locations;

assigning a portion of the data segments to each of the plurality of computing devices in response to determining that the plurality of computing devices are within the threshold distance from each other;

assigning an identification (ID) to each data segment;

generating a data segment map;

transmitting from the server to each of the plurality of computing devices that computing device's assigned portion of the data segments; and transmitting the data segment map to each of the plurality of computing devices, wherein the data segment map comprises each data segment's ID and data segment assignment information.

67. The non-transitory processor-readable medium of claim 66, wherein the stored processor-executable instructions are configured to cause a server processor to perform operations further comprising:

determining a data set characteristic, wherein separating the data set into data segments comprises separating the data set into data segments based, at least in part, on the determined data set characteristic.

68. The non-transitory processor-readable medium of claim 66, wherein the stored processor-executable instructions are configured to cause a server processor to perform operations further comprising:

determining a connection bandwidth for each connection between the server and each of the plurality of computing devices; and determining a total available bandwidth based on a sum of all the connection bandwidths between the server and the plurality of computing devices, wherein assigning a portion of the data segments to each of the plurality of computing devices comprises assigning data segments to each of the plurality of computing devices in proportion to each computing device's connection bandwidth as a percentage of the determined total available bandwidth.

69. The non-transitory processor-readable medium of claim 66, wherein the stored processor-executable instructions are configured to cause a server processor to perform operations further comprising:

determining a connection bandwidth for each connection between the server and each of the plurality of computing devices; and determining data segment assignments among the plurality of computing devices that will result in a shortest estimated download time, wherein assigning a portion of the data segments to each of the plurality of computing devices comprises assigning data segments to each of the plurality of computing devices based on the determined shortest estimated download time.

70. The non-transitory processor-readable medium of claim 66, wherein the stored processor-executable instructions are configured to cause a server processor to perform operations further comprising:

determining a connection type for each connection between the server and each of the plurality of computing devices;

determining a cost associated with each connection type; and determining data segment assignments among the plurality of computing devices that will result in a lowest total download cost, wherein assigning a portion of the data segments to each of the plurality of devices comprises assigning data segments to each of the plurality of computing devices based on the determined lowest total download cost.

71. The non-transitory processor-readable medium of claim 66, wherein the stored processor-executable instructions are configured to cause a server processor to perform operations further comprising:

determining when a data connection between the server and one of the plurality of computing devices is lost; and transmitting the data set assigned to the computing device with which the connection was lost from the server to a remaining one or more of the plurality of computing devices connected to the server.

72. The non-transitory processor-readable medium of claim 66, wherein the stored processor-executable instructions are configured to cause a server processor to perform operations further comprising:

determining a device type for each of the plurality of computing devices; and determining an amount of each data segment to send to each of the plurality of computing devices based on each computing device's determined device type, wherein transmitting from the server to each of the plurality of computing devices that computing device's assigned portion of the data segments comprises transmitting the determined amount of each data segment to send for that computing device.

73. The non-transitory processor-readable medium of claim 66, wherein the stored processor-executable instructions are configured to cause a server processor to perform operations further comprising:

determining a user preference setting, wherein assigning a portion of the data segments to each of the plurality of computing devices is based, at least in part, on the determined user preference setting.

74. The non-transitory processor readable medium of claim 66, wherein the data set comprises e-mail.

75. The non-transitory processor-readable medium of claim 66, wherein the stored processor-executable instructions are configured to cause a server processor to perform operations further comprising:

determining an initial connection bandwidth for each connection between the server and each of the plurality of computing devices;

determining a total initial available bandwidth based on a sum of all the initial connection bandwidths between the server and the plurality of computing devices, wherein assigning a portion of the data segments to each of the plurality of computing devices comprises initially assigning data segments to each of the plurality of computing devices in proportion to each computing device's initial connection bandwidth as a percentage of the total initial available bandwidth;

monitoring a connection bandwidth for each connection between the server and the plurality of computing devices;

determining if a change occurs in connection bandwidth for each connection between the server and any one of the plurality of computing devices; and if a change occurs in the connection bandwidth for each connection between the server and the plurality of computing devices,
- determining an updated connection bandwidth for each connection between the server and the plurality of computing devices;
- determining a total updated available bandwidth based on a sum of all the updated connection bandwidths between the server and each of the plurality of computing devices;
- reassigning data segments to each of the plurality of computing devices in proportion to each computing device's updated connection bandwidth as a percentage of the total updated available bandwidth; and
- transmitting from the server to each of the plurality of computing devices that computing device's reassigned portion of the data segments.

* * * * *